(12) United States Patent
Kim

(10) Patent No.: US 11,798,252 B2
(45) Date of Patent: Oct. 24, 2023

(54) ELECTRONIC DEVICE AND CONTROL METHOD THEREFOR

(71) Applicant: SAMSUNG ELECTRONICS CO., LTD., Suwon-si (KR)

(72) Inventor: Hyungrae Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 159 days.

(21) Appl. No.: 17/278,122

(22) PCT Filed: May 31, 2019

(86) PCT No.: PCT/KR2019/006547
§ 371 (c)(1),
(2) Date: Mar. 19, 2021

(87) PCT Pub. No.: WO2020/085600
PCT Pub. Date: Apr. 30, 2020

(65) Prior Publication Data
US 2021/0350164 A1 Nov. 11, 2021

(30) Foreign Application Priority Data
Oct. 24, 2018 (KR) .......................... 10-2018-0127237

(51) Int. Cl.
*G06V 10/24* (2022.01)
*G06N 3/02* (2006.01)
(Continued)

(52) U.S. Cl.
CPC ............. *G06V 10/242* (2022.01); *G06N 3/02* (2013.01); *G06T 5/20* (2013.01); *G06T 7/40* (2013.01);
(Continued)

(58) Field of Classification Search
CPC .... G06V 10/451; G06V 10/764; G06V 10/82; G06V 10/242; G06V 20/40; G06N 3/02;
(Continued)

(56) References Cited

U.S. PATENT DOCUMENTS 6,647,377 B2 11/2003 Jannarone
10,108,858 B2 10/2018 Derakhshani et al.
(Continued)

FOREIGN PATENT DOCUMENTS

KR 2000-0023923 A 5/2000
KR 10-2013-0102550 A 9/2013
(Continued)

OTHER PUBLICATIONS

International Search Report and Written Opinion of the International Searching Authority dated Sep. 18, 2019 from International Application No. PCT/KR20191/006547, 16 pages
(Continued)

*Primary Examiner* — Andrae S Allison
(74) *Attorney, Agent, or Firm* — STAAS & HALSEY LLP

(57) ABSTRACT

The present disclosure relates to an artificial intelligence (AI) system that utilizes a machine learning algorithm and an application thereof. Disclosed is an electronic device. The electronic device comprises: a memory in which a first filter for identifying an input image is stored; and a processor for rotating between a plurality of elements included in the memory in which the first filter is stored and a plurality of elements included in the first filter, obtaining at least one second filter by scaling a filter region including at least some of the plurality of elements, and identifying the input image on the basis of a result value obtained by performing convolution on a pixel value included in the input image with each of the first filter and the second filter.

13 Claims, 18 Drawing Sheets

(51) Int. Cl.
  *G06T 5/20* (2006.01)
  *G06T 7/40* (2017.01)
  *G06V 10/764* (2022.01)
  *G06V 10/82* (2022.01)

(52) U.S. Cl.
  CPC ............ G06V 10/764 (2022.01); G06V 10/82 (2022.01); *G06T 2207/20084* (2013.01)

(58) Field of Classification Search
  CPC .......... G06N 3/045; G06N 3/084; G06N 3/08; G06T 5/20; G06T 7/40; G06T 2207/20084; G06T 2207/20081
  See application file for complete search history.

(56) References Cited

U.S. PATENT DOCUMENTS

| | | | |
|---|---|---|---|
| 10,319,075 | B2 | 6/2019 | Kothule et al. |
| 2013/0156345 | A1 | 6/2013 | Shmunk |
| 2017/0132760 | A1* | 5/2017 | Kothule ................ G06T 3/4053 |
| 2018/0107921 | A1 | 4/2018 | Ross et al. |
| 2018/0157961 | A1 | 6/2018 | Henry et al. |
| 2018/0181858 | A1* | 6/2018 | Son ........................... G06N 3/08 |
| 2018/0182083 | A1 | 6/2018 | Natroshvili et al. |
| 2018/0342044 | A1* | 11/2018 | Lutz .......................... G06N 3/04 |
| 2020/0026952 | A1* | 1/2020 | Kim ...................... G06V 30/194 |
| 2020/0364486 | A1* | 11/2020 | Park ...................... G06F 18/253 |
| 2020/0364829 | A1* | 11/2020 | Ahn ...................... G06V 10/764 |
| 2022/0004808 | A1* | 1/2022 | Yuan ...................... G06V 10/82 |
| 2022/0067429 | A1* | 3/2022 | Kwon ....................... G06T 3/40 |
| 2022/0084167 | A1* | 3/2022 | Choi ..................... G06T 3/4046 |

FOREIGN PATENT DOCUMENTS

| | | |
|---|---|---|
| KR | 10-1309889 B1 | 9/2013 |
| KR | 10-2017-0058277 A | 5/2017 |
| KR | 10-2018-0004898 A | 1/2018 |
| KR | 10-2018-0062910 A | 6/2018 |
| KR | 10-2018-0066610 A | 6/2018 |
| KR | 10-2018-0073118 A | 7/2018 |
| KR | 10-2018-0096164 A | 8/2018 |

OTHER PUBLICATIONS

Korean Office Action dated Mar. 20, 2023 for Korean Application No. 10-2018-0127237.

* cited by examiner

FIG. 8

| 6 | 15 | 3 |
|---|----|---|
| 6 | 15 | 3 |
| 6 | 15 | 3 |

<REPRESENTATIVE VALUE, AVERAGE>

WEIGHT A

| A11 | A12 | A13 |
|-----|-----|-----|
| A21 | A22 | A23 |
| A31 | A32 | A33 |

WEIGHT B

| B11 | B12 | B13 |
|-----|-----|-----|
| B21 | B22 | B23 |
| B31 | B32 | B33 |

$$\begin{pmatrix} 6 & 15 & 3 \\ 6 & 15 & 3 \\ 6 & 15 & 3 \end{pmatrix} * \begin{pmatrix} A11 & A12 & A13 \\ A21 & A22 & A23 \\ A31 & A32 & A33 \end{pmatrix} \quad \begin{pmatrix} 6 & 15 & 3 \\ 6 & 15 & 3 \\ 6 & 15 & 3 \end{pmatrix} * \begin{pmatrix} B11 & B12 & B13 \\ B21 & B22 & B23 \\ B31 & B32 & B33 \end{pmatrix}$$

FIG. 13
| SECOND ELEMENT | THIRD ELEMENT | SECOND ELEMENT |
|---|---|---|
| THIRD ELEMENT | FIRST ELEMENT | THIRD ELEMENT |
| SECOND ELEMENT | THIRD ELEMENT | SECOND ELEMENT |
| 2 | 1 | 2 |
|---|---|---|
| 1 | 3 | 1 |
| 2 | 1 | 2 |
\<BASIC FILTER\>
| 3 | 1 | 3 |
|---|---|---|
| 1 | 3 | 1 |
| 3 | 1 | 3 |
\<SUBSTITUTE SECOND ELEMENT WITH FIRST ELEMENT (3)\>
| 3 | 3 | 3 |
|---|---|---|
| 3 | 3 | 3 |
| 3 | 3 | 3 |
\<SUBSTITUTE THIRD ELEMENT WITH FIRST ELEMENT (3)\>
| 3 | 3 | 3 |
|---|---|---|
| 3 | 3 | 3 |
| 3 | 3 | 3 |
\<MODIFIED FILTER\>

FIG. 14

FIG. 16
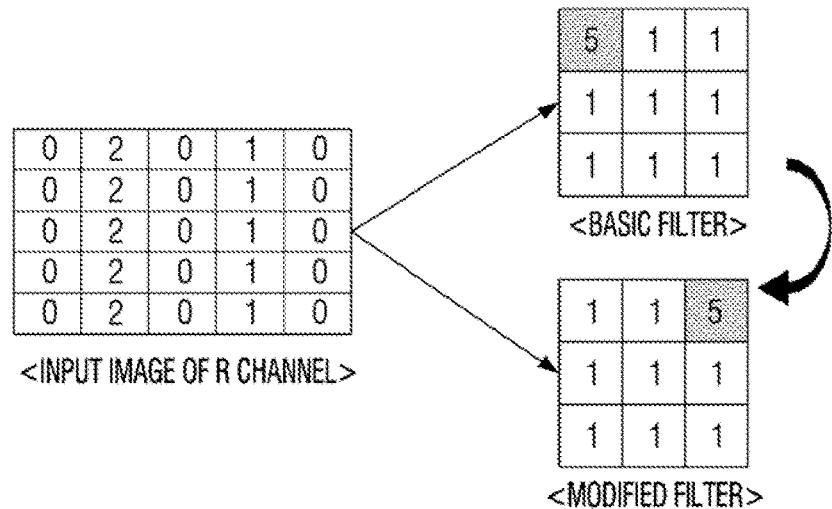
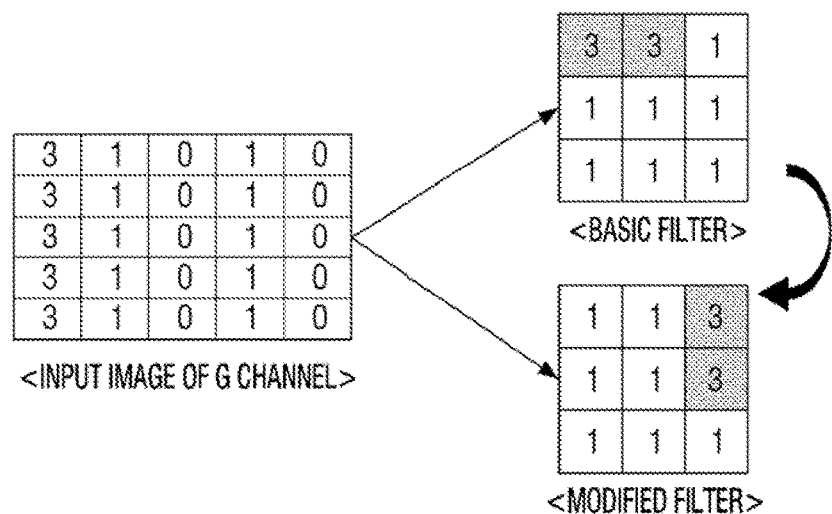
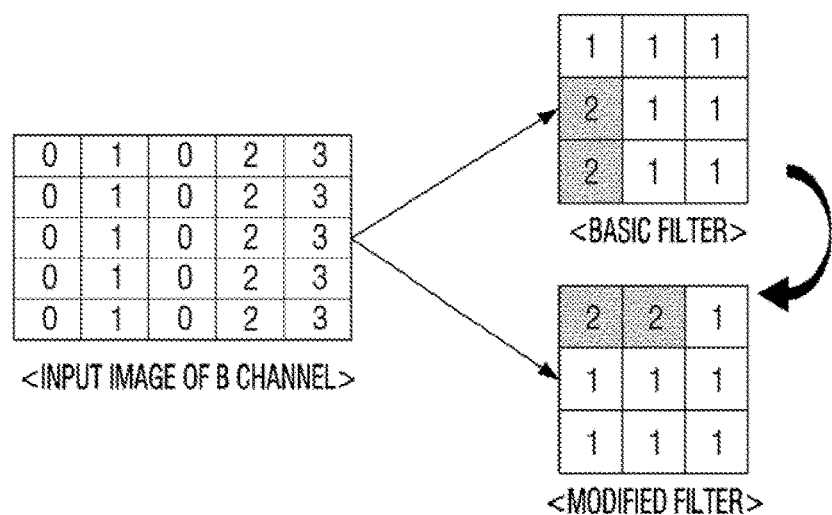

FIG. 17
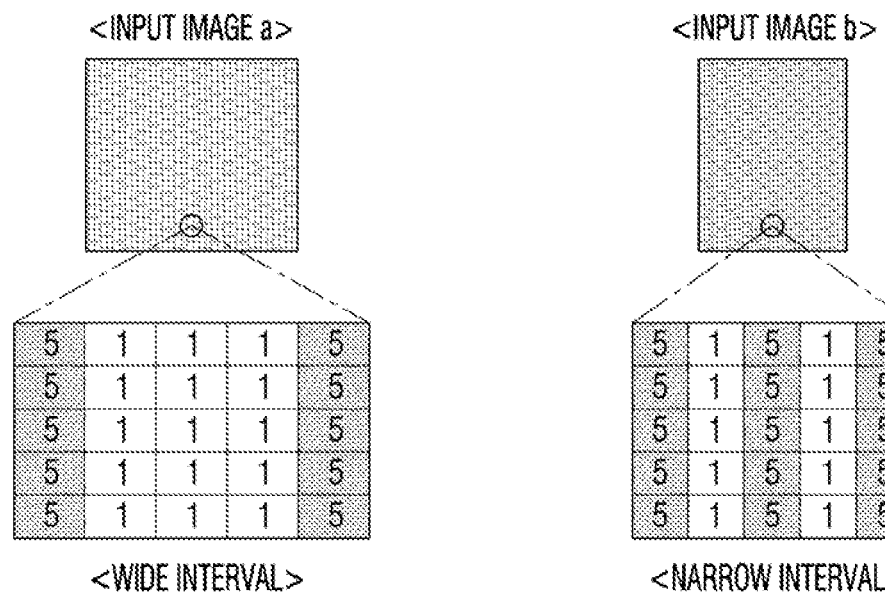
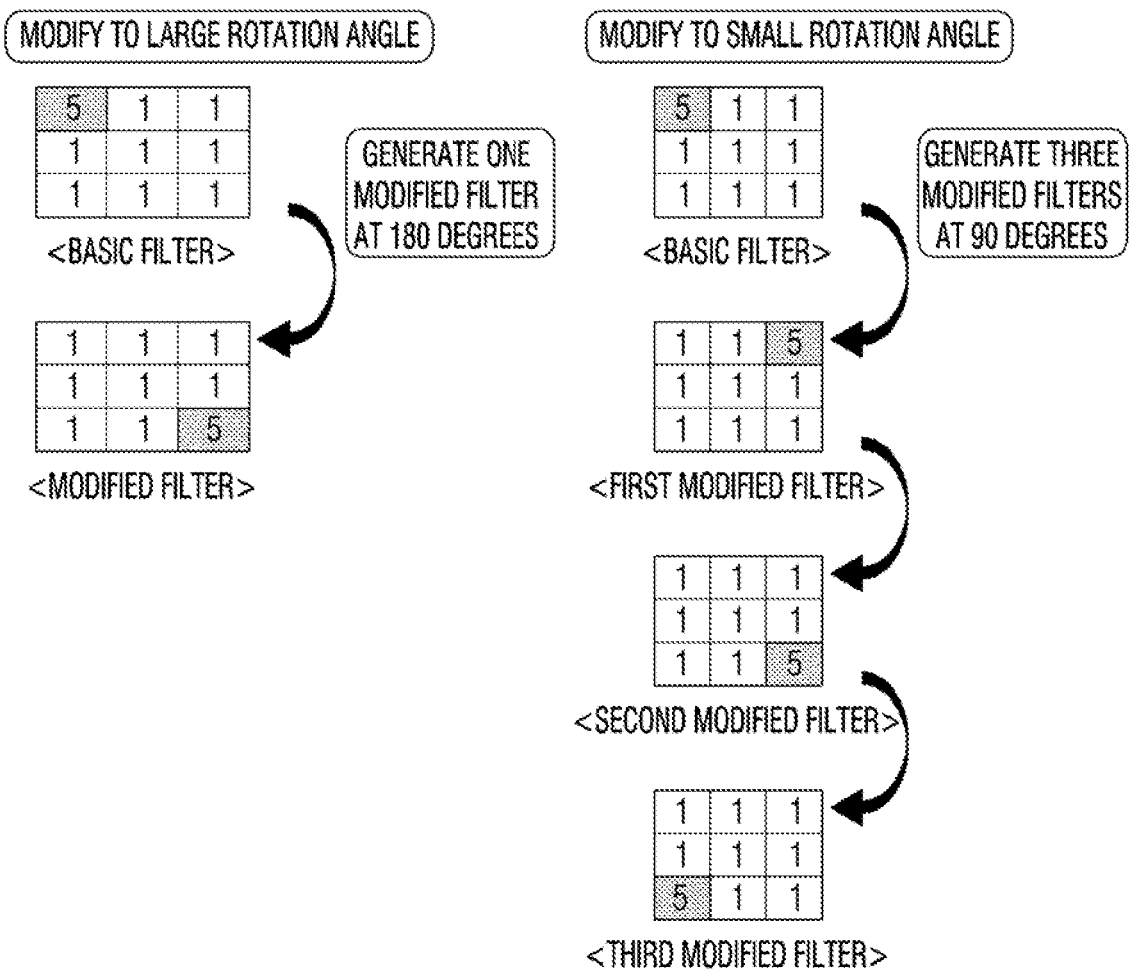

ELECTRONIC DEVICE AND CONTROL METHOD THEREFOR

CROSS-REFERENCE TO RELATED APPLIATIONS

This application is a U.S. National Stage Application, which claims the benefit under 35 U.S.C. § 371 of PCT International Patent Application No. PCT/KR2019/006547, filed May 31, 2019 which claims the foreign priority benefit under 35 U.S.C. § 119 of Korean Patent Application No. 10-2018-0127237, filed Oct. 24, 2018, the contents of which are incorporated herein by reference.

TECHNICAL FIELD

This disclosure relates to an electronic device and a control method thereof. More particularly, this disclosure relates to an electronic device which recognizes a target of an input image using an artificial intelligence (AI) model and a control method thereof.

BACKGROUND ART

An AI system is a computer system which realizes a human-level intelligence that the machine learns and judges. As the use of AI systems improves, a recognition rate may be improved.

AI technology is composed of machine learning (deep learning) using an algorithm that is capable of classifying or learning characteristics of input data and an element technology that simulates functions such as recognition and judgment of a human brain using machine learning algorithms.

The element technology may include at least one of language understanding for recognizing a human language/character, visual understanding for recognizing the object as a human eye, an inference/prediction for determining and predicting information by determining information, knowledge representation for processing human experience information as knowledge data, and operation control for controlling the autonomous driving of the vehicle and the movement of the robot.

A texture may be recognized by extracting a feature portion and analyzing the extracted feature portion using a recent AI technology. In order to recognize a texture, a deep neural network (DNN) may be used, and a lot of data may be required for a high recognition rate. As for a texture, since there may be a significant change in a degree of rotation, size, etc. of the subject, there may be a problem in that a lot of data is required in a method of recognition using the DNN. In general, since the recognition rate may vary according to the degree of rotation, the size, and the degree of magnification in the case of a texture, training may be performed by increasing an amount of data, and there may be a problem in that high performance hardware may be required to process the increased learning amount, and the learning time may be lengthened. If an input image corresponding to a specific rotation degree (specific angle) of the target input image is omitted, there may be a problem in that the recognition rate is lowered.

DISCLOSURE

Technical Problem

It is an object of the disclosure to provide an electronic device which recognizes a target by applying a modified filter to a convolutional neural network (CNN) model and a control method thereof.

Technical Solution

In accordance with an aspect of the disclosure, an electronic device includes a memory configured to store a first filter for identifying an input image and a processor configured to obtain at least one second filter by rotating a plurality of elements included in the first filter or scaling a filter region including at least some of the plurality of elements (scaling a filter region including at least some of a plurality of elements included in the first filter), and identify the input image based on a result value obtained by performing convolution on a pixel value included in the input image with the first filter and the second filter, respectively.

The processor may obtain a first result value by performing convolution on a pixel value included in the input image and the first filter, obtain a second result value by performing convolution on a pixel value included in the input image and the second filter, and identify an input image for identifying a texture type of the input image based on a representative value obtained based on the first result value and the second result value.

The processor may obtain a probability of including a predetermined texture type in the input image by applying a weight corresponding the predetermined texture type to the representative value.

The processor may obtain the second filter by sequentially rotating the plurality of elements included in the first filter by a predetermined angle in a clockwise direction or a counterclockwise direction.

The processor may obtain a first modified filter by sequentially rotating the plurality of elements included in the first filter by a first angle in a clockwise direction or a counterclockwise direction, and obtain a second modified filter by sequentially rotating the plurality of elements included in the first filter by a second angle in a clockwise direction or a counterclockwise direction.

The processor may obtain a first modified filter by sequentially rotating the plurality of elements included in the first filter by a first angle in a clockwise direction or a counterclockwise direction, and obtain a second modified filter by sequentially rotating the plurality of elements included in the first modified filter by the first angle in a clockwise direction or a counterclockwise direction.

The processor may obtain a second filter by moving a position of at least some elements included in the filter region in a scaling direction.

The processor may obtain the second filter by enlarging the filter region by moving a location of a first element included in the filter region to outside of the filter region, replacing a second element included in a location to which the first element is moved with the first element, and replacing a third element included in a location to which the first element is not moved at an outside of the filter region with the first element.

The memory may store a first basic filter and a second basic filter that correspond to a first input channel and a second input channel(the first basic filter and a second basic filter are corresponding to a first filter to identify the input image), and the processor may obtain a first modified filter and a second modified filter by rotating a plurality of elements included in the first basic filter and the second basic filter or scaling a filter region including at least some of the plurality of elements, obtain a first result value by performing convolution on a pixel value corresponding to a first input channel included in the input image with the first basic filter, obtain a second result value by performing convolution on a pixel value corresponding to the first input channel with the first modified filter, obtain a third result value by performing convolution on a pixel value corresponding to the second input channel included in the input image with the second basic filter, obtain a fourth result value by performing convolution on a pixel value corresponding to the second input channel with the second modified filter, and identify a texture type of the input image based on a first representative value obtained based on the first result value and the second result value, and a second representative value obtained based on the third result value and the fourth result value.

The processor may obtain a first probability value by applying a first weight corresponding to a first texture type to the first representative value, obtain a second probability value by applying a second weight corresponding to the first texture type to the second representative value, obtain a third probability value by applying a third weight corresponding to a second texture type to the first representative value, obtaining a fourth probability value by applying a fourth weight corresponding to the second texture type to the second representative value, obtain a probability of including the first texture type in the input image by summing the first probability value and the second probability value, and obtain a probability of including the second texture type in the input image by summing the third probability value and the fourth probability value.

A control method of the electronic device storing a first filter for identifying an input image according to an embodiment may include obtaining at least one second filter by rotating a plurality of elements included in the first filter or scaling a filter region including at least some of the plurality of elements, and identifying the input image based on a result value obtained by performing convolution on a pixel value included in an input image with the first filter and the second filter, respectively.

The identifying the input image may include obtaining a first result value by performing convolution on a pixel value included in the input image with the first filter, obtaining a second result value by performing convolution on a pixel value included in the input image with the second filter, and identifying an input image for identifying a texture type of the input image based on a representative value obtained based on the first result value and the second result value.

The identifying the input image may include obtaining a probability of including a predetermined texture type in the input image by applying a weight corresponding the predetermined texture type to the representative value.

The obtaining the second filter may include obtaining the second filter by sequentially rotating the plurality of elements included in the first filter by a predetermined angle in a clockwise direction or a counterclockwise direction.

The obtaining the second filter may include obtaining a first modified filter by sequentially rotating the plurality of elements included in the first filter by a first angle in a clockwise direction or a counterclockwise direction, and obtaining a second modified filter by sequentially rotating the plurality of elements included in the first filter by a first angle in a clockwise direction or a counterclockwise direction.

The obtaining the second filter may include obtaining a first modified filter by sequentially rotating the plurality of elements included in the first filter by a first angle in a clockwise direction or a counterclockwise direction, and obtaining a second modified filter by sequentially rotating the plurality of elements included in the first modified filter by the first angle in a clockwise direction or a counterclockwise direction.

The obtaining the second filter may include obtaining the second filter by moving a position of at least some elements included in the filter region in a scaling direction.

The obtaining the second filter may include obtaining the second filter by enlarging the filter region by moving a location of a first element included in the filter region to outside of the filter region, replacing a second element included in a location to which the first element is moved with the first element, and replacing a third element included in a location to which the first element is not moved at an outside of the filter region with the first element.

According to a control method of the electronic device storing a first basic filter and a second basic filter corresponding to a first input channel and a second input channel and storing a first filter for identifying the input image, the obtaining the second filter may include obtaining a first modified filter and a second modified filter by rotating a plurality of elements included in the first basic filter and the second basic filter or scaling a filter region including at least some of the plurality of elements, obtaining a first result value by performing convolution on a pixel value corresponding to a first input channel included in the input image with the first basic filter, obtaining a second result value by performing convolution on a pixel value corresponding to the first input channel with the first modified filter, obtaining a third result value by performing convolution on a pixel value corresponding to the second input channel included in the input image with the second basic filter, obtaining a fourth result value by performing convolution on a pixel value corresponding to the second input channel with the second modified filter, and identifying a texture type of the input image based on a first representative value obtained based on the first result value and the second result value, and a second representative value obtained based on the third result value and the fourth result value.

The identifying the input image may include obtaining a first probability value by applying a first weight corresponding to a first texture type to the first representative value, obtaining a second probability value by applying a second weight corresponding to the first texture type to the second representative value, obtaining a third probability value by applying a third weight corresponding to a second texture type to the first representative value, obtaining a fourth probability value by applying a fourth weight corresponding to the second texture type to the second representative value, obtaining a probability of including the first texture type in the input image by summing the first probability value and the second probability value, and obtaining a probability of including the second texture type in the input image by summing the third probability value and the fourth probability value.

DESCRIPTION OF DRAWINGS

FIG. 8 is a diagram illustrating an operation considering a weight in the CNN model;

FIG. 13 is a diagram illustrating an operation to obtain a modified filter by scaling a basic filter;

FIG. 14 is a diagram illustrating various embodiments of obtaining a modified filter by scaling;

FIG. 16 is a diagram illustrating an embodiment of applying an input image including three channels to the CNN model;

FIG. 17 is a diagram illustrating an embodiment of generating a modified filter differently by analyzing an input image.

MODE FOR CARRYING OUT THE INVENTION

Figure 1:
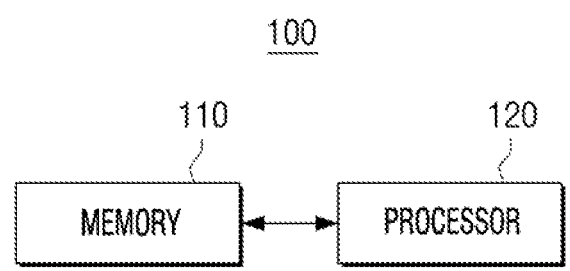
FIG. 1 is a block diagram of an electronic device according to an embodiment.

Before specifically describing the disclosure, a method for demonstrating the specification and drawings will be described.

Terms used in the specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. The terms may be interpreted as a meaning defined in the specification. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

These embodiments are capable of various modifications and have various embodiments, and specific embodiments are illustrated in the drawings and described in detail in the description. It should be understood, however, that it is not intended to limit the scope of the specific embodiments but includes all transformations, equivalents, and alternatives falling within the disclosed spirit and scope. When it is decided that a detailed description for the known art related to the disclosure may unnecessarily obscure the gist of the disclosure, the detailed description will be omitted.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

A computation in the disclosure may be performed by a recognition system based on machine learning, and a deep-learning recognition is described as an example of a classification system by a series of machine learning algorithms based on neural networks.

The recognition system based on deep learning may include at least one classifier that may correspond to one or a plurality of processors. A processor may be implemented as an array of a plurality of logic gates and in a combination of a general microprocessor and a memory in which a program that may be executed in the microprocessor is stored.

The classifier may be implemented as a neural network-based classifier, a support vector machine (SVM), an Adaboost classifier, a Bayesian classifier, a Perceptron classifier, or the like. The classifier will be described with respect to an embodiment implemented as a classifier based on convolutional neural network (CNN). The neural network-based classifier is a computation model implemented to simulate the computational capacity of a biological system by using a large number of artificial neurons connected by a connection line, and may perform a human cognitive function or a learning process through a connection line having a connection strength (weight). However, the classifier of the disclosure is not limited thereto, and may be implemented with various classifiers.

A general neural network may include an input layer, a hidden layer, and an output layer, and the hidden layer may be composed of one or more layers as needed. In this case, a back propagation algorithm may be used as an algorithm for training the neural network.

If some data is input to the input layer of the neural network, the classifier can train the neural network so that the output data for the inputted learning data is output to the output layer of the neural network. When the feature information extracted from a captured image is input, a pattern of the feature information may be classified into any one class of the various classes using the neural network, and a classification result may be output.

The processor may use the recognition system based on deep learning as a classification system based on a series of machine learning algorithms of neural networks.

In describing the recognition system based on deep learning, visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge/probability based inference, optimization prediction, preference-based planning, recommendation, or the like.

FIG. 1 is a block diagram of an electronic device according to an embodiment.

Referring to FIG. 1, an electronic device 100 according to an embodiment may include a memory 110 and a processor 120.

The electronic device 100 may be a television (TV), a desktop personal computer (PC), a notebook, a smartphone, a tablet PC, a server, or the like. The electronic device 100 may be a system itself in which clouding computer environment is established, that is, a cloud server. The electronic device 100 may be a device including recognition system based on deep learning.

The memory 110 may be implemented as an internal memory such as a read-only memory (ROM), such as electrically erasable programmable read-only memory (EEPROM), and a random-access memory (RAM) or a memory separate from the processor 120.

The memory 110 may store a first filter to identify an input image. According to an embodiment, the first filter is to identify texture of the input image. Hereinbelow, the first filter is referred to as a basic filter for convenience.

The basic filter may correspond to one of the convolution filters used in a convolutional neural network (CNN). The number of basic filters applied to the CNN learning model may vary depending on the number of input channels. For example, if the number of channels including the input image is three, the basic filter may be three. The size of the basic filter may vary depending on the input image or setting of the user. The memory 110 may store information about various basic filters in advance.

In this case, the memory 110 may be implemented as at least one of a memory embedded within the electronic device 100 or a memory detachable from the electronic device 100 according to the usage of data storage. For example, the data for driving the electronic device 100 may be stored in the memory embedded within the electronic device 100, and the data for upscaling of the electronic device 100 may be stored in the memory detachable from the electronic device 100.

The memory 110 embedded in the electronic device 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the electronic device 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

The processor 120 may perform overall control operations of the electronic device 100. To be specific, the processor may function to control overall operations of the electronic device.

The processor 120 may be implemented with at least one of a digital signal processor (DSP), a microprocessor, and a time controller (TCON), a central processing unit (CPU), a micro controller unit (MCU), a micro processing unit, a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type.

The processor 120 may obtain pixel information included in an input image. The input image may include a pixel value indicating a color or illumination value, and the processor 120 may identify a pixel value corresponding to at least one channel which the input image may have.

The processor 120 may perform a convolution operation used in a CNN learning model by applying a convolution filter to a pixel value included in an input image. A detailed description of the convolution operation (convolution computation) will be described later with reference to FIGS. 5 and 6.

The convolution operation may correspond to a computation process for performing a CNN learning model and may be calculated through several convolution layers until the texture of the object is recognized. Here, the CNN structure may be set by a user, and more than one operation may be performed according to the set CNN structure.

According to an implementation example, the convolution operation may be performed once, or may be performed several times iteratively. The number of convolution operations may change according to the CNN learning model set by a user.

The processor 120 may rotate the first filter, i.e., a plurality of elements included in the basic filter, or scale the filter region including at least a portion of the plurality of elements to obtain at least one second filter. Hereinafter, the second filter is referred to as a modified filter for convenience.

Convolution may be performed on the pixel value included in the input image and the basic filter to obtain a first result value, and the convolution may be performed on the pixel value and the modified filter included in the input image to obtain a second result value. The processor 120 may obtain a representative value based on the first result value and the second result value, and may identify a texture type of the input image based on a representative value.

The processor 120 may obtain a representative value using the first result value and the second result value. The processor 120 may obtain a maximum value of the first result value and the second result value, or an average value of the first result value and the second result value as a representative value. The processor 120 may obtain a representative value according to a method predetermined (or preset) by a user, depending on whether a maximum value or an average value is to be used.

The basic filter may be one of convolution filters applied to the stored CNN learning model. The basic filter may correspond to a suitable filter to recognize the input image. According to an implementation example, if the processor 120 determines that there is no suitable filter corresponding to the input image, the processor 120 may randomly generate the basic filter to have a random value.

The element may refer to a pixel value of the input image or a value of the convolution filter. For example, a 3×3 size filter may include nine elements. In the case of an input image, the elements may correspond to a value indicating information on the image. For example, the elements of the input image may refer to an illumination value or a value of an RGB channel.

The convolution filter may refer to a filter used for the CNN learning model. In describing the electronic device, the convolution filter may include a basic filter and a modified filter.

Texture may refer to touch, feel, or the like, of an object surface to be a target of the input image. The processor 120 may obtain a probability that a predetermined texture type is included in the input image by applying a weight corresponding to a predetermined texture type to the representative value. A specific method of applying weights will be described later with reference to FIG. 8.

The processor 120 may obtain the modified filter by sequentially rotating the plurality of elements included in the basic filter by a predetermined angle in a clockwise or counterclockwise direction.

The predetermined angle may be 45 degrees, 90 degrees, 180 degrees, and the like. However, according to an embodiment, the processor 120 may obtain a modified filter by rotating at a different angle in addition to the above-described angle. In recognizing the texture, the texture may have no specific orientation, such as a general object. For example, when an input image which is obtained by capturing a front surface of a cotton fabric and an input image which is obtained by capturing after rotating the cotton fabric by a predetermined angle are recognized, the pixel information may be different but the same result value should be output. Therefore, the recognition rate may be increased by inputting a plurality of input images of the target to be analyzed. However, even when only one input image is input, a similar effect may be obtained by generating a modified filter.

A method of obtaining the modified filter by rotating the basic filter will be described with reference to FIGS. 9 to 12 below.

The processor 120 may apply a plurality of convolution filters even if the input image is one. For example, the processor 120 may apply one basic filter and a plurality of modified filters to the input image.

The processor 120 may obtain a first modified filter by sequentially rotating a plurality of elements included in the basic filter by a first angle in a clockwise direction or a counterclockwise direction, and rotate a plurality of elements included in the basic filter by a second angle in a clockwise or counterclockwise direction to obtain a second modified filter. For example, the processor 120 may obtain the first modified filter by rotating the basic filter by 45 degrees and may obtain the second modified filter by rotating the basic filter by 90 degrees again. Various embodiments of obtaining a plurality of modified filters using a basic filter will be described in detail in FIG. 9.

The processor 120 may obtain the first modified filter by sequentially rotating a plurality of elements included in the basic filter by a first angle in a clockwise or counterclockwise direction, and may obtain the second modified filter by sequentially rotating the plurality of elements included in the first modified filter by a first angle in a clockwise or counterclockwise direction. For example, the processor 120 may rotate the basic filter by 45 degrees to obtain the first modified filter. The processor 120 may rotate the first modified filter by 45 degrees to obtain the second modified filter. A method of using a modified filter without using a basic filter and a specific embodiment will be described later with reference to FIG. 10.

The processor 120 may obtain the modified filter by moving a location of at least some elements included in the filter region in a scaling direction.

The scaling method may be a method of changing a size of all elements included in the basic filter. The filter region may include all elements of the basic filter.

The processor 120 may perform a scaling operation on the basis of elements corresponding to a specific region of the basic filter. The processor 120 may expand or reduce the elements of the specific region.

The processor 120 may identify the specific region of the input image using the filter value obtained from the input image. The processor 120 may perform various scaling operations of the filter using the elements of the identified specific region.

The processor 120 may move the location of the first element included in the filter region to the outside of the filter region to enlarge the filter region, replace the second element included in the location where the first element is moved to the first element, and replace the third element included in the location where the first element is not moved outside the filter region with the first element to obtain the modified filter. A method for obtaining the modified filter by expanding or reducing a basic filter by a scaling method and a specific embodiment will be described later with reference to FIGS. 13 to 15.

An example of including a plurality of channels by an input image is assumed.

The memory 110 may store the first and second basic filters corresponding to the first and second input channels, and the processor 120 may obtain first and second modified filters corresponding to the first and second basic filters. The processor 120 may obtain a basic filter corresponding to a channel included in an input image among a plurality of basic filters stored in the memory 110. For example, if the input image includes an R channel, a G channel, and a B channel, the processor 120 may identify a first basic filter corresponding to the R channel, a second basic filter corresponding to the G channel, and a third basic filter corresponding to the B channel.

The processor 120 may obtain a first result value by performing convolution on a pixel value corresponding to a first input channel included in an input image and a first basic filter, and performing convolution on a pixel value corresponding to the first input channel and a first modified filter to obtain a second result value.

The processor 120 may obtain a third result value by performing convolution on a pixel value corresponding to a second input channel included in the input image and a second basic filter, and performing convolution on the pixel value corresponding to the second input channel and the second modified filter to obtain a fourth result value.

The processor 120 may obtain the first and second result values for the first input channel. The processor 120 may obtain the third and fourth result values for the second input channel.

The processor 120 may obtain the first representative value based on the first result value and the second result value and may obtain the second representative value based on the third result value and the fourth result value.

The processor 120 may obtain the first representative value for the first input channel and may obtain the second representative value for the second input channel.

The processor 120 may identify a texture type of the input image based on the first and second representative values. The processor 120 may convert to one representative value using a plurality of representative values for the first input channel and the second input channel. The processor 120 may sum a plurality of representative values for respective input channels to convert to one representative value. The processor 120 may apply a weight to the summed representative value to obtain a probability that a predetermined texture type is included in the input image.

The processor 120 may obtain the first probability value by applying the first weight corresponding to the first texture type to the first representative value and may obtain the second probability value by applying the second weight corresponding to the first texture type to the second representative value.

The first representative value is a value for the first input channel and the second representative value may mean a value for the second input channel. The processor 120 may apply a weight to the first texture time according to the input channel and obtain a separate probability value according to the input channel.

According to an embodiment, obtaining the first representative value and the second representative value by the operation of one time to describe a simple structure. However, in actual environment, the first and second representative values may be obtained through a plurality of convolution layers.

The processor 120 may apply a weight for the second texture type other than the first texture type. Specifically, a third weight value corresponding to a second texture type may be applied to a first representative value to obtain a third probability value, and a fourth weight value corresponding to a second texture type may be applied to the second representative value to obtain a fourth probability value.

The processor 120 may sum the first and second probability values to obtain a probability that a first texture type is included in the input image, and may sum the third and fourth probability values to obtain a probability that a second texture type is included in the input image. An embodiment of an input image including a plurality of input channels will be described below in FIG. 16.

In obtaining the modified filter by the processor 120, a method of rotating the elements or a method of enlarging or reducing by scaling has been described. One of the two methods has been described. For example, it is assumed that one basic filter and two modified filters are used to perform the convolution operation. The processor 120 may obtain two modified filters in a rotating manner, or may obtain both of the modified filters in a scaling manner.

In actual implementation, the processor 120 may perform a convolution operation using both of the two methods. For example, the processor 120 may perform a convolution operation using a first modified filter obtained by one basic filter and a rotation method and a second modified filter obtained by a scaling method.

According to an embodiment, the processor 120 may have stored the basic filter and may have stored the modified filter through rotating or scaling.

According to still another implementation, the processor 120 may pre-store only the basic filter and analyze the information on the input image, and then obtain a modified filter. Here, the operation of analyzing information on the input image may be an operation distinguished from identifying an input image. The operation of analyzing information on an input image may mean identifying a feature part or a specific pattern based on a pixel value included in the input image. The processor 120 may compare whether the identified feature or pattern corresponds to predetermined data. The memory 110 may store a method of generating a modified filter corresponding to a feature or pattern. For example, the processor 120 may set to generate a modified filter in a manner of rotating the input image including a pattern of A by 90 degrees. The processor 120 may pre-identify a suitable modified filter generation method according to the feature or pattern, and may improve the recognition rate of the texture recognition and shorten the processing speed.

In the manner described above, the processor 120 may analyze the information on the input image to determine whether the modified filter is to be obtained by rotating or scaling. In addition, the processor 120 may analyze the information on the input image to determine how many modified filters will be generated. The processor 120 may analyze the information on the input image to determine whether to rotate the input image at which degrees. The processor 120 may analyze the information on the input image to determine the size of the scaling, the direction of the scaling, and the like.

The processor 120 may determine whether to rotate the basic filter in a clockwise direction or in a counterclockwise direction depending on the feature portion or pattern obtained from the input image. For example, if the processor 120 identifies that the pattern of feature portion extracted from the input image forms a clockwise direction, the processor 120 may rotate the basic filter in a clockwise direction to obtain a modified filter. Conversely, if the processor 120 identifies that the pattern of feature point extracted from the input image forms a counterclockwise direction, the processor 120 may rotate the basic filter in a counterclockwise direction to obtain a modified filter.

The electronic device 100 may obtain a pixel information distribution of a target based on pixel information obtained from an input image. The electronic device 100 may obtain a repeated pattern of an object based on the obtained pixel information distribution of the target. The electronic device 100 may identify an interval of repeated patterns. In addition, the electronic device 100 may determine a method of obtaining a modified filter based on an interval of repeated patterns. A specific embodiment will be described below in FIG. 17.

The electronic device 100 according to an embodiment may perform a texture recognition operation with only one input image. The electronic device 100 may have similar effects using a basic filter and a modified filter instead of analyzing a plurality of input images rotated at various angles or a plurality of input images that are obtained by enlarging or reducing the analysis target. The electronic device 100 may receive one fixed input image instead of using a plurality of input images.

The elements included in the convolution filter (the basic filter and the modified filter) may be modified in the learning process. Although the electronic device 100 according to an embodiment has been described as being performed only once, the convolution operation may be repeatedly performed in an actual implementation and values included in a convolution filter (a basic filter and a modified filter) may be continuously changed.

The basic filter and the modified filter according to an embodiment may be considered one filter. Since the modified filter is only modification of the basic filter by rotating or scaling and the basic filter and the modified filter may be considered one filter. When a CNN learning model is applied, even if the elements of the basic filter and the modified filter are modified in the learning process, the learning operation for one filter may be performed eventually. Therefore, since only a single filter is trained, the input image (input data) required for learning may be simplified and learning convergence may be facilitated. In addition, a CNN learning model may be used while maintaining a relatively simple structure, thereby improving a learning recognition rate. Since the trained modified filter may be modified in the same manner again to generate a convolution filter, the overall texture recognition rate may be increased.

Figure 2:
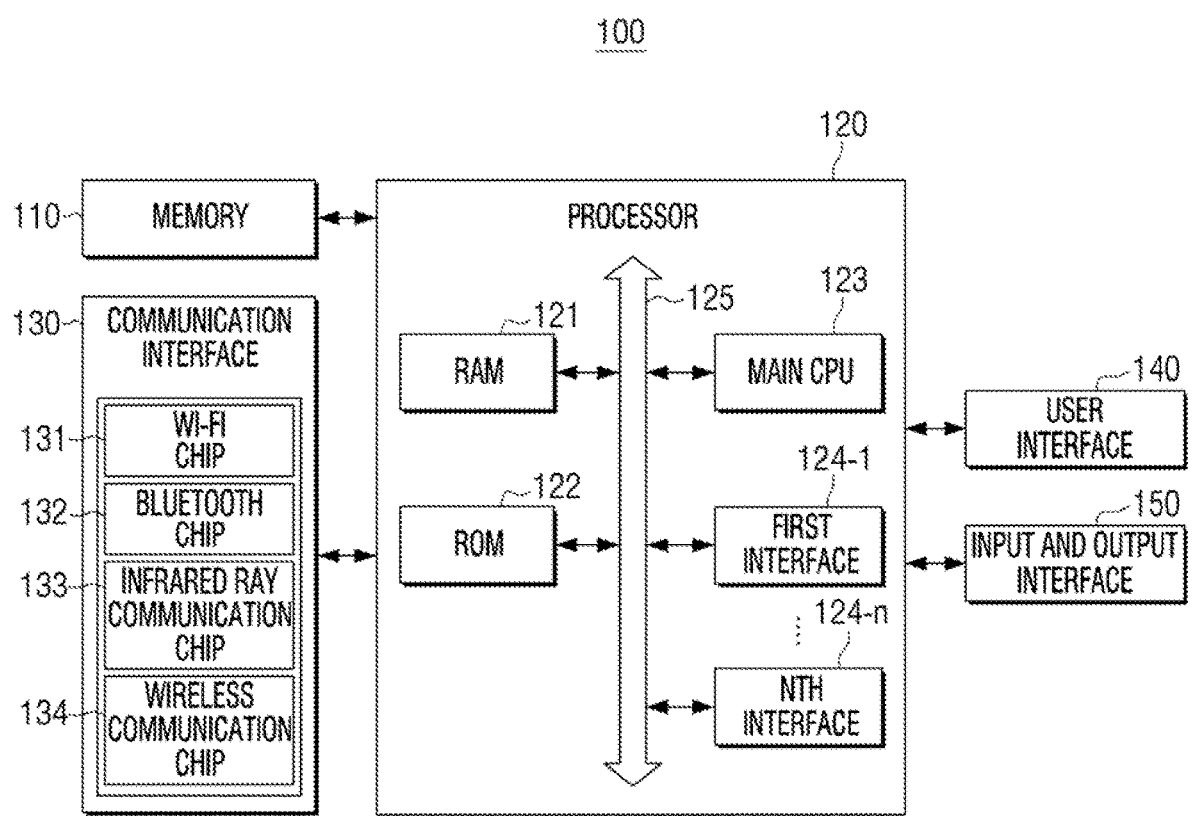
FIG. 2 is a block diagram illustrating a specific configuration of the electronic device of FIG. 1.

FIG. 2 is a block diagram illustrating a specific configuration of the electronic device 100 of FIG. 1.

Referring to FIG. 2, the electronic device 100 may include the memory 110, the processor 120, a communication interface 130, a user interface 140, and an input/output interface 150.

The description of the operations of the memory 110 and the processor 120 will be omitted to avoid redundant description.

The processor 120 controls overall operations of the electronic device 100 using various programs stored in the memory 110.

To be specific, the processor 120 includes a random access memory (RAM) 121, a read only memory (ROM) 122, a main central processing unit (CPU) 123, a first to $n^{th}$ interfaces 124-1~124-n, and a bus 125.

The RAM 121, ROM 122, main CPU 123, the first to $n^{th}$ interfaces 124-1~124-n, or the like, may be interconnected through the bus 125.

The ROM 122 stores a command set for booting the system and the like. When the turn-on command is input and power is supplied, the CPU 123 copies the OS stored in the memory 110 to the RAM 121 according to a command stored in the ROM 122, and executes the OS to boot the system. When the booting is completed, the CPU 123 copies various application programs stored in the memory 110 to the RAM 121, executes the application program copied to the RAM 121, and performs various operations.

The main CPU 123 accesses the memory 110 and performs booting using an operating system (OS) stored in the memory 110, and performs various operations using various programs, contents data, or the like, stored in the memory 110.

The first to $n^{th}$ interface 124-1 to 124-n are connected to the various elements described above. One of the interfaces may be a network interface connected to an external device through the network.

The processor 120 may perform a graphic processing function (video processing function). For example, the processor 120 may generate a screen including various objects such as icons, images, text, and the like using a calculator (not shown) and a renderer (not shown). Here, a calculator (not shown) may calculate an attribute value such as a coordinate value, a shape, a size, and a color to be displayed by each object according to the layout of the screen based on the received control command. A renderer (not shown) may generate display screens of various layouts including objects based on the attribute value calculated by the calculator (not shown). The processor 120 may perform various image processing such as decoding, scaling, noise filtering, frame rate conversion, resolution conversion, or the like, for the video data.

The processor 120 may perform processing of audio data. Specifically, the processor 120 may perform various processing such as decoding, amplifying, noise filtering, and the like, on the audio data.

The communication interface 130 is a configuration to communicate with various types of external devices according to various types of communication methods. The communication interface 130 includes a Wi-Fi chip 131, a Bluetooth chip 132, an infrared ray communication chip 133, a wireless communication chip 134, or the like. The processor 120 may communicate with various external devices using the communication interface 130.

The communication interface 130 may communicate with other external devices or the external server. At this time, the external device may be an electronic apparatus capable of outputting image contents. For example, when the external device is a TV, the type of the external device is an image device, and output data information of the TV may include a model name of a TV, audio characteristics of the output contents of the TV, frequency characteristics of the output audio from among the TV output contents, or the like, but are not limited thereto. In addition, the external device communicating with the communication interface 130 may include a remote controller, a Bluetooth speaker, a lighting device, a smart cleaner, a smart refrigerator, an IoT home manager, or the like, in addition to a device capable of outputting image contents. For example, the communication interface 130 may transmit video/audio data or various control data to the external device or the external server.

The Wi-Fi chip 131 and the Bluetooth chip 132 perform communication by the Wi-Fi method and Bluetooth method, respectively. When using the Wi-Fi chip 131 or the Bluetooth chip 132, the various connection information such as the SSID and the session key may be transceived first, and various information may be transceived after communication connection.

The infrared ray communication chip 133 performs communication according to infrared data association (IrDA) technology that transmits data wireless to local area using infrared ray between visible rays and millimeter waves.

The wireless communication chip 134 means a chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the Wi-Fi chip 131 and the Bluetooth chip 132 described above.

The communication interface 130 may include at least one of a wired communication module performing communication using a local area network (LAN) module, Ethernet module, a pair cable, a coaxial cable, an optical fiber cable, or the like.

According to an embodiment, the communication interface 130 may use the same communication module (for example, Wi-Fi module) for communicating with an external device such as a remote controller and an external server.

According to another example, the communication interface 130 may use a different communication module (for example, a Wi-Fi module) to communicate with an external server and an external device such as a remote controller. For example, the communication interface 130 may use at least one of an Ethernet module or a Wi-Fi module to communicate with the external server, and may use a Bluetooth (BT) module to communicate with an external device such as a remote controller. However, this is only an example and the communication interface 130 may use at least one communication module among various communication modules when communicating with a plurality of external devices or external server.

The communication interface 130 may further include at least one of a tuner and a demodulator, according to an implementation example.

The tuner (not shown) may receive a radio frequency (RF) broadcasting signal by tuning a channel selected by a user or all the prestored channels, fro, among RF broadcasting signals that are received through the antenna.

A demodulator (not shown) may receive and demodulate a digital intermediate frequency (DIF) signal that is converted by the tuner, and perform channel decoding, or the like.

The user interface 140 may be implemented as a button, a touch pad, a mouse, and a keyboard, or may be implemented as a touch screen which may perform the display function and a manipulation input function as well. Here, the button may be various types of buttons such as a mechanical button, a touch pad, a wheel, or the like formed on an arbitrary region such as a front portion, a side portion, a back portion, or the like, of an outer part of the main body of the electronic device 100.

The input and output interface 150 may be one of the high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The HDMI is an interface capable of transmitting high performance data for an AV device which inputs and outputs audio and video signals. The DP is the interface which may implement an image of a full HD but also an ultra-high resolution screen such as 2560X1600 or 3840X2160, and a 3D stereoscopic image, and transmit a digital sound. The Thunderbolt is an input/output interface for high-speed data transmission and connection, and may connect a PC, a display, a storage device, and the like, with one port in parallel.

The input and output interface 150 may input and output at least one of an audio signal and a video signal.

According to an example, the input and output interface 150 may include a port to input and output only an audio signal or a port to input and output only a video signal as a separate port, or may be implemented as a port which input and output both the audio signal and the video signal.

The electronic device 100 may be implemented as a device not including a display and transmit an image signal to a separate display device.

The electronic device 100 may transmit the audio (or voice) signal to the external server in order to recognize audio (or voice) signal received from the external device.

In this case, a communication module for communicating with the external device and the external server may be implemented as one. For example, a communication module for communicating with the external device and the external server may be the same as the Wi-Fi module.

A communication module for communicating with the external device and the external server may be implemented separately. For example, communication with the external device may be performed through a Bluetooth module, and communication with the external server may be performed through the Ethernet modem or the Wi-Fi module.

Figure 3:
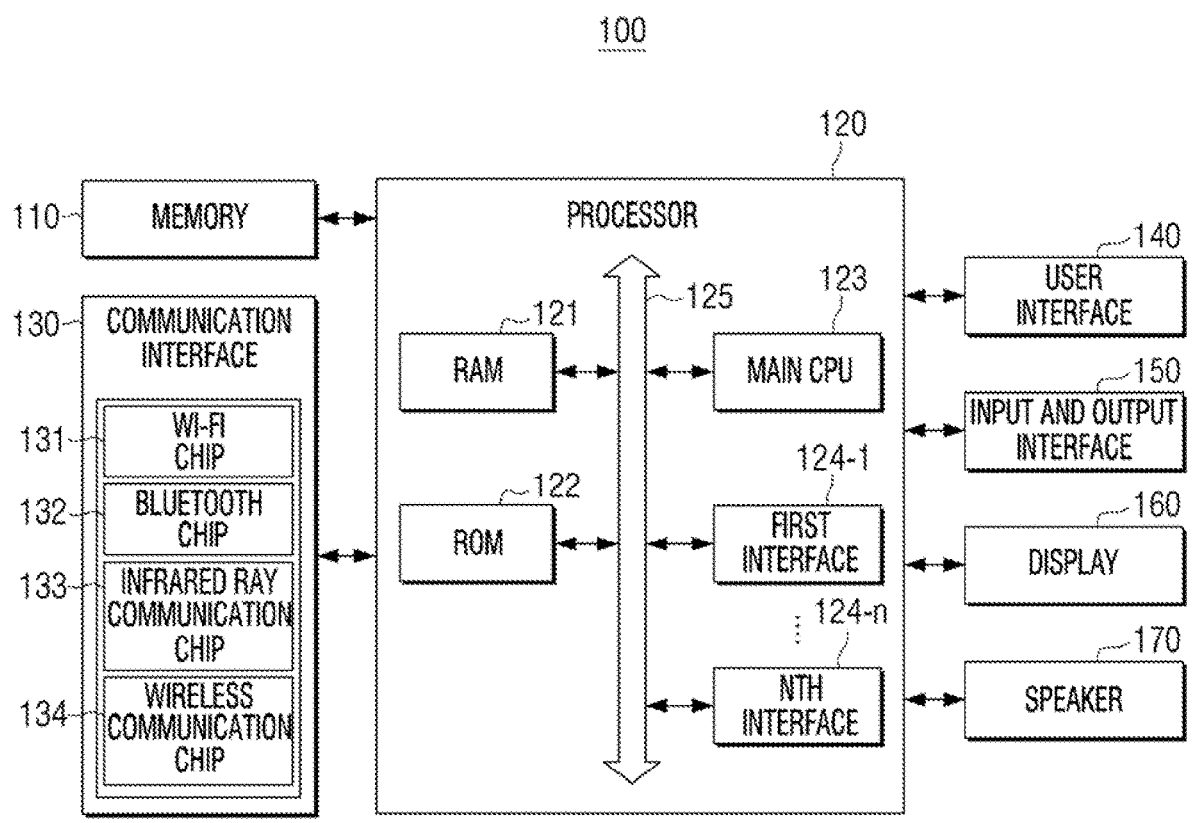
FIG. 3 is a block diagram illustrating a specific configuration of an electronic device according to still another embodiment.

FIG. 3 is a block diagram illustrating a specific configuration of an electronic device according to still another embodiment.

Referring to FIG. 3, a display 160 and a speaker 170 may be further included, in addition to the configurations of FIG. 2.

The display 160 may be implemented as a display of various types such as a liquid crystal display (LCD), organic light emitting diodes (OLED) display, plasma display panel (PDP), or the like. In the display 160, a backlight unit, a driving circuit which may be implemented as an a-si TFT, low temperature poly silicon (LTPS) TFT, organic TFT (OTFT), or the like, may be included as well. In the meantime, the display 160 may be implemented as a touch screen coupled with a touch sensor, a flexible display, a third-dimensional (3D) display, or the like.

According to an embodiment, the display 160 may include a display panel for outputting an image and a bezel housing a display panel. According to an embodiment, the bezel may include a touch sensor (not shown) for sensing user interaction.

The speaker 170 is a component to output various notification sounds or a voice message in addition to various audio data processed by the input/output interface 150.

The electronic device 100 may further include a microphone (not shown). The microphone is an element to receive a user voice or other sound and convert to audio data. The microphone may convert the received analog user voice signal into a digital signal and transmit the signal to the electronic device 100.

Figure 4:
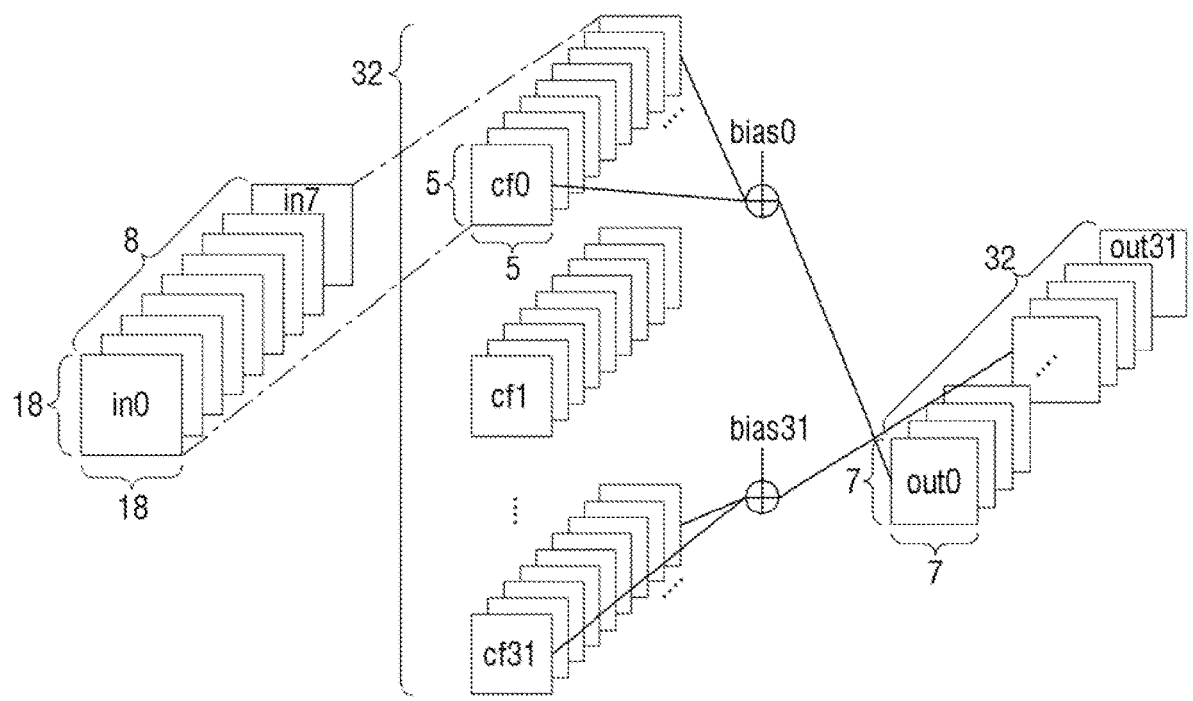
FIG. 4 is a diagram illustrating a structure of a CNN.

FIG. 4 is a diagram illustrating a structure of a CNN.

Referring to FIG. 4, it may be assumed that the input image is 8 channels of 18*18 size, the output is assumed to be 32 channels having a size of 7*7. The convolution filter may have a size of 5*5 and may exist by 32 for each input channel. Thus, there may be 256 total convolution filters.

The number of convolution filters existing for each input channel in a convolution operation according to an embodiment may be the same as the number of output channels.

As the number of filters increases, the electronic device 100 may increase the time of executing the CNN model. Increasing the number of filters may mean that the computation process becomes complicated and the time for learning convergence becomes longer.

Figure 5:
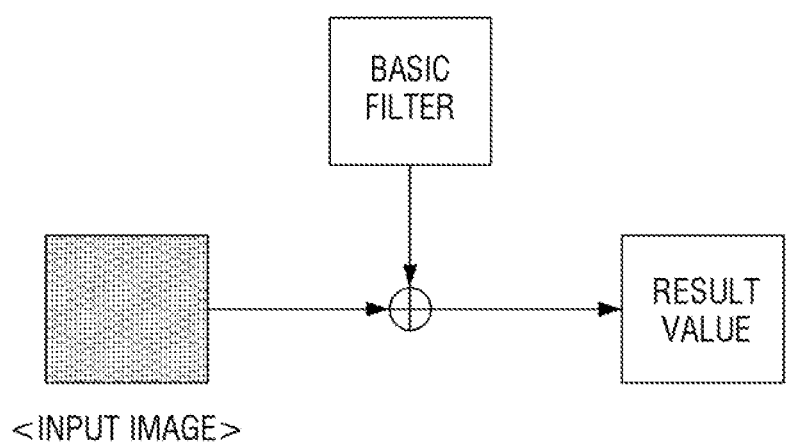
FIG. 5 is a diagram illustrating a convolution operation of a CNN model.

FIG. 5 is a diagram illustrating a convolution operation of a CNN model.

Referring to FIG. 5, a convolution computation (convolution operation) may be performed by applying a basic filter based on pixel information obtained from an input image. The input image may include pixel information corresponding to at least one channel, and the electronic device 100 may apply a basic filter stored by the CNN model to the corresponding pixel information.

When the electronic device 100 applies a basic filter to the pixel information obtained from the input image, the electronic device 100 may obtain a result value. The resulting value may mean a final result value. However, according to the feature of the CNN model, the result value may refer to a result value of one convolution operation, and a similar convolution operation may be repeated several times. Here, each time the convolution operation is performed, the electronic device 100 may apply the convolution filter equally or differently. For example, if the electronic device 100 performs the initial convolution operation, it may be assumed that the electronic device 100 may apply an f1 filter to the pixel information of the input image. The result value may be the result obtained by performing the initial one convolution operation, and the electronic device 100 may then perform the convolution operation repeatedly. The electronic device 100 may obtain a second result value that is a new result by applying an f2 filter to a first result value obtained by applying the f1 filter.

Figure 6:
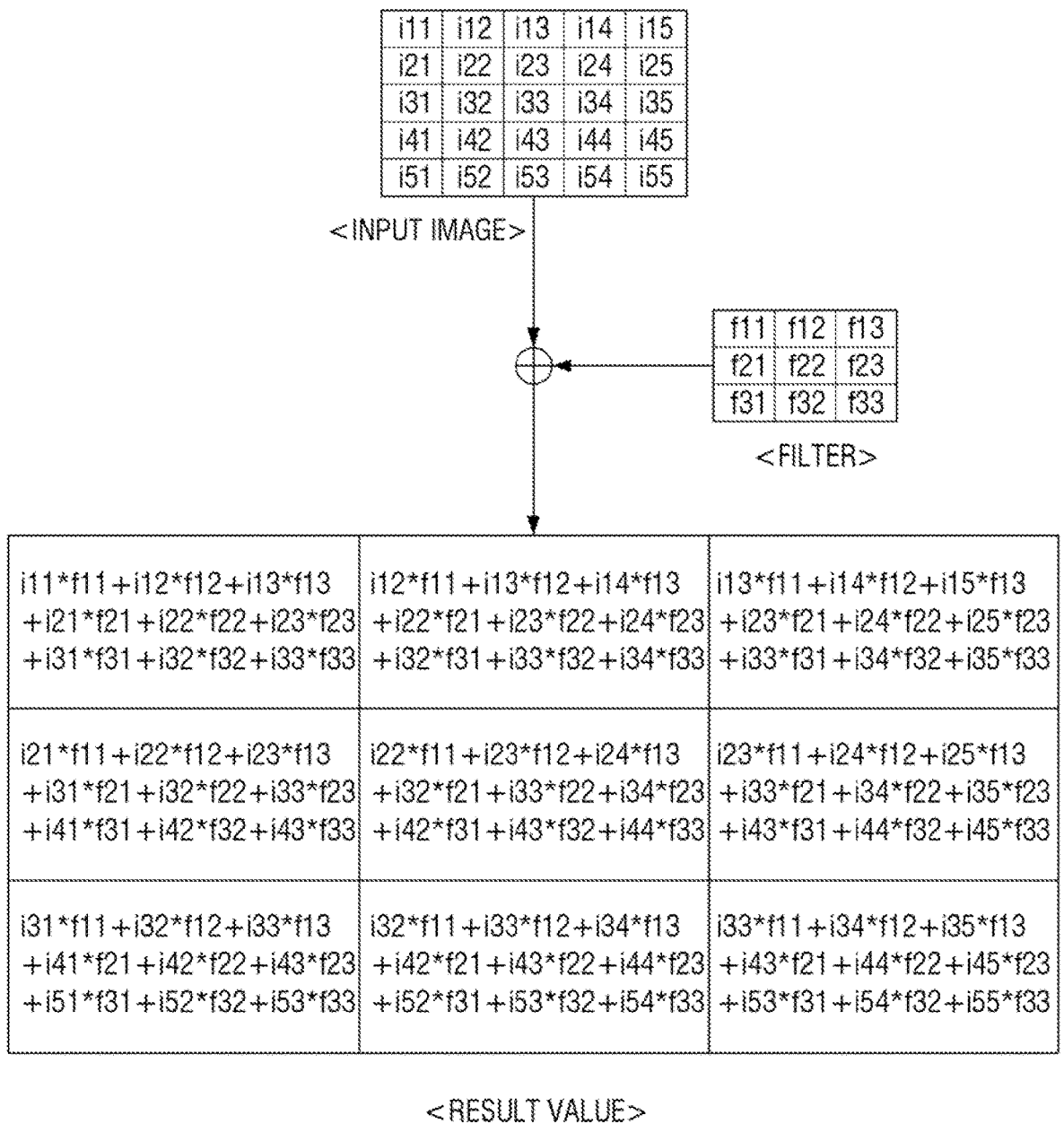
FIG. 6 is a diagram illustrating a specific computation of the convolution operation of the CNN model.

FIG. 6 is a diagram illustrating a specific computation of the convolution operation of the CNN model.

Referring to FIG. 6, the electronic device 100 may receive an input image having a size of 5*5, and the convolution filter may have a size of 3*3. The pixel information obtained from the input image may be i11 to i55, and each of i11 to i55 corresponds to an element. The element may correspond to a value corresponding to each pixel. For example, the element may mean a value that may represent an image such as color, illumination, or the like. Referring to FIG. 6, the input image may be 5×5 and 25 elements. Each element may be represented by i11 to i55.

The electronic device 100 may perform a convolution operation using an input image having a size of 5*5 and a convolution filter having a size of 3*3. Specifically, when a convolution operation is performed, a result value of 3*3 may be obtained. The computation of the convolution operation is as follows.

[i11*f11+i12*f12+i13*f13+i21*f21+i22*f22+i23*f23+i31*f31+i32*f32+i33*f33, i12*f11+i13*f12+i14*f13+i22*f21+i23*f22+i24*f23+i32*f31+i33*f32+i34*f33, i13*f11+i14*f12+i15*f13+i23*f21+i24*f22+i25*f23+i33*f31+i34*f32+i35*f33; i21*f11+i22*f12+i23*f13+i31*f21+i32*f22+i33*f23+i41*f31+i42*f32+i43*f33, i22*f11+i23*f12+i24*f13+i32*f21+i33*f22+i34*f23+i42*f31+i43*f32+i44*f33, i23*f11+i24*f12+i25*f13+i33*f21+i34*f22+i35*f23+i43*f31+i44*f32+i45*f33; i31*f11+i32*f12+i33*f13+i41*f21+i42*f22+i43*f23+i51*f31+i52*f32+i53*f33, i32*f11+i33*f12+i34*f13+i42*f21+i43*f22+i44*f23+i52*f31+i53*f32+i54*f33, i33*f11+i34*f12+i35*f13+i43*f21+i44*f22+i45*f23+i53*f31+i54*f32+i55*f33]

Referring to FIG. 6, the result value of 3*3 is output, but the size of the result value may vary according to the size of the input image or the size of the filter.

In describing FIGS. 5 and 6, one convolution filter is applied to one input channel. However, a plurality of convolution filters may be applied to one input channel.

Figure 7:
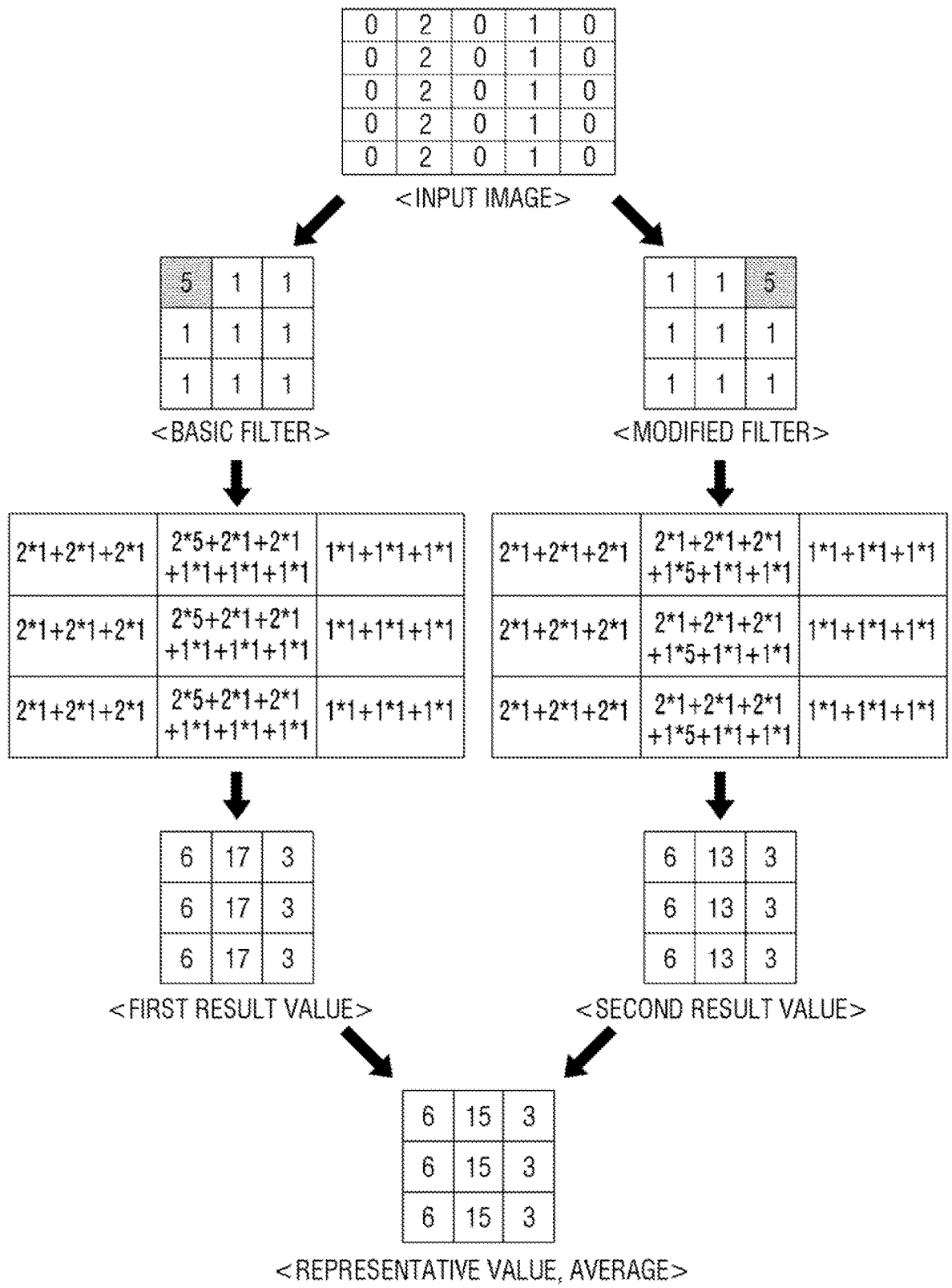
FIG. 7 is a diagram illustrating a basic filter and a modified filter applied in the convolution operation of the CNN model.

FIG. 7 is a diagram illustrating a basic filter and a modified filter applied in the convolution operation of the CNN model.

The electronic device 100 may obtain pixel information from the input image including one channel, and may perform convolution operation by applying the basic filter and the modified filter to the obtained pixel information.

Referring to FIG. 7, the electronic device 100 may perform a convolution operation by applying a basic filter to pixel information obtained from an input image. The electronic device 100 may obtain the first result value through the computation process shown in FIG. 7. A specific convolution operation may be performed using the formula of FIG. 6.

The electronic device 100 may perform a convolution operation using a modified filter which is a filter modified from the basic filter. The electronic device 100 may use both a basic filter and a modified filter. The electronic device 100 may obtain a second result value using a modified filter. A specific convolution operation may be performed using the formula of FIG. 6.

The electronic device 100 may obtain a plurality of result values using a basic filter and a modified filter. The electronic device 100 may use an average value to obtain a representative value. For example, the average value of the first result value and the second result value may be obtained as a representative value.

In illustrating FIG. 7, an average is used in a method of obtaining a representative value. However, a method of obtaining a maximum value other than an average value may be used in actual implementation. For example, the electronic device 100 may obtain the maximum value [6,17,3; 6,17,3; 6,17,3] of the first result value [6,17,3; 6,17,3; 6,17,3] and the second result value [6,13,3; 6,13,3; 6,13,3] as a representative value.

The modified filter may correspond to a filter that rotates the basic filter in a clockwise direction by 90 degrees. The degree 90° may correspond to a predetermined angle and the number of modified filters may also be a predetermined number. The predetermined angle and the number of predetermined filters may be changed by the user's setting. A method of obtaining a modified filter by rotating a basic filter will be described later with reference to FIGS. 9 and 10.

FIG. 8 is a diagram illustrating an operation considering a weight in the CNN model.

The electronic device 100 may apply a predetermined weight based on the representative value obtained in FIG. 7. The number of predetermined weights may vary depending on the size of the representative value. For example, the representative value according to FIG. 8 may be composed of nine elements with a size of 3*3, and the weight may be composed of nine elements with a size of 3*3.

The electronic device 100 may obtain an output value by applying weight A to the representative value. The weight A corresponds to A11 to A33 in FIG. 8, and may be composed of nine elements. The output value obtained by applying the weight A to the representative value may mean a probability that the input image corresponds to A, and a specific computation equation is shown in FIG. 8.

The electronic device 100 may obtain an output value by applying a weight B other than the weight A. The output value obtained by using the weight B may mean the probability that the input image corresponds to B, and the specific equation is shown in FIG. 8.

Figure 9:
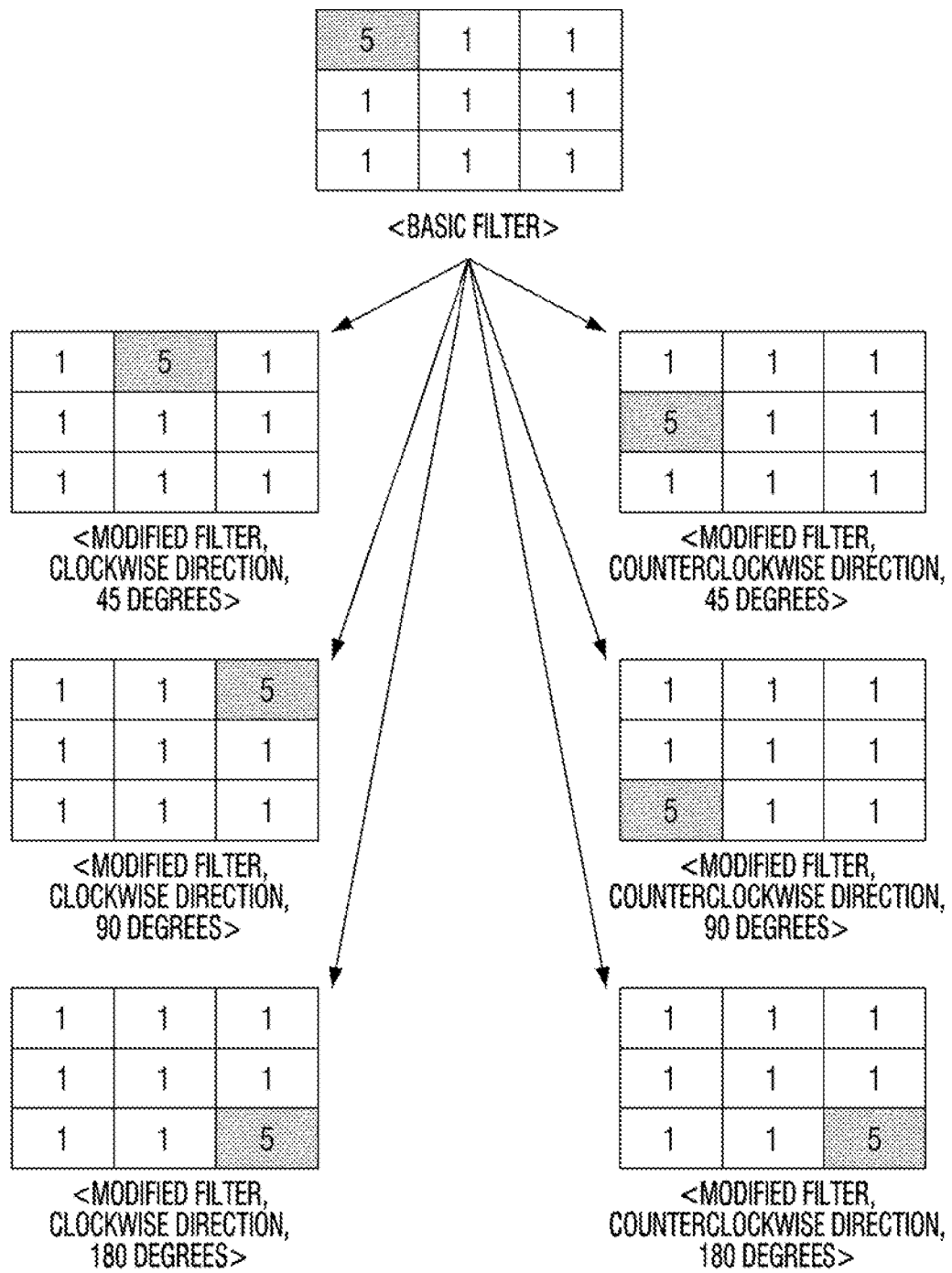
FIG. 9 is a diagram illustrating an operation of obtaining a modified filter by rotating a basic filter by a predetermined angle.

FIG. 9 is a diagram illustrating an operation of obtaining a modified filter by rotating a basic filter by a predetermined angle.

Referring to FIG. 9, the electronic device 100 may obtain the modified filter by rotating the element in the basic filter in a clockwise direction or counterclockwise direction by a predetermined angle.

For example, there may be a basic filter [5,1,1; 1,1,1; 1,1,1]. The electronic device 100 may obtain a modified filter [1,5,1; 1,1,1; 1,1,1] by rotating the basic filter by 45 degrees in a clockwise direction. The electronic device 100 may obtain a modified filter [1,1,5; 1,1,1; 1,1,1] by rotating the basic filter by 90 degrees in a clockwise direction. The electronic device 100 may obtain a modified filter [1,1,1; 1,1,1; 1,1,5] by rotating the basic filter by 180 degrees in a clockwise direction.

The electronic device 100 may obtain a modified filter by rotating the basic filter in the counterclockwise direction. The electronic device 100 may obtain a modified filter [1,1,1; 5,1,1; 1,1,1] by rotating the basic filter by 45 degrees in the counterclockwise direction. The electronic device 100 may obtain a modified filter [1,1,1; 1,1,1; 5,1,1] by rotating the basic filter by 90 degrees in the counterclockwise direction. The electronic device 100 may obtain a modified filter [1,1,1; 1,1,1; 1,1,5] by rotating the basic filter by 180 degrees in a counterclockwise direction.

The modified filter described in FIG. 9 may correspond to a convolution filter modified with reference to a basic filter. The clockwise or counterclockwise direction may be changed by the user's setting. The predetermined angle, such as 45°, 90°, etc., may also be changed by the user's setting.

The electronic device 100 may analyze the input image to determine a method of obtaining a modified filter. The electronic device 100 may determine whether to rotate the basic filter in a clockwise direction according to a feature portion obtained from the input image. For example, if the electronic device 100 identifies that a pattern of features extracted from the input image forms a clockwise direction, the electronic device 100 may rotate the basic filter in a clockwise direction to obtain a modified filter. Conversely, if the electronic device 100 identifies that the pattern of features extracted from the input image forms a counterclockwise direction, the electronic device 100 may rotate the basic filter in a counterclockwise direction to obtain a modified filter.

The electronic device 100 may determine an angle of rotation according to the feature portion obtained from the input image. A detail will be described in FIG. 17.

Figure 10:
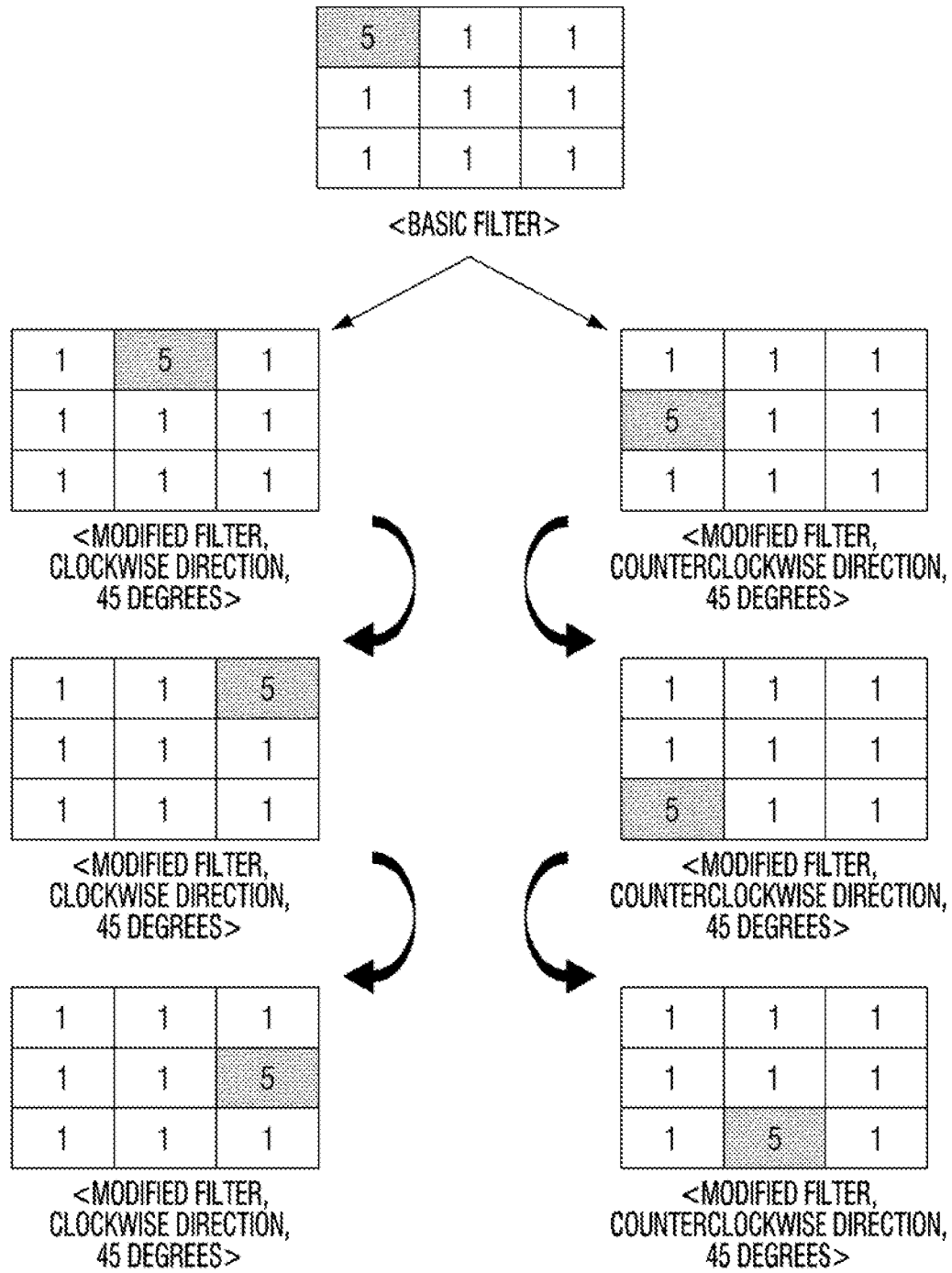
FIG. 10 is a diagram illustrating an operation of obtaining a new modified filter using a modified filter.

FIG. 10 is a diagram illustrating an operation of obtaining a new modified filter using a modified filter.

Referring to FIG. 10, the electronic device 100 may obtain a new modified filter by rotating the modified filter. For example, there may be a basic filter [5,1,1; 1,1,1; 1,1,1]. The electronic device 100 may obtain the modified filter [1,5,1; 1,1,1; 1,1,1] by rotating the basic filter by 45 degrees in a clockwise direction. The electronic device 100 may obtain the modified filter [1,1,5; 1,1,1; 1,1,1] by rotating the modified filter [1,5,1; 1,1,1; 1,1,1] by 45 degrees in a clockwise direction. The electronic device 100 may rotate the modified filter [1,1,5; 1,1,1; 1,1,1] by 45 degrees in a clockwise direction to obtain the modified filter [1,1,1; 1,1,5; 1,1,1].

The electronic device 100 may obtain the modified filter [1,1,1; 5,1,1; 1,1,1] by rotating the basic filter by 45 degrees in a counterclockwise direction. The electronic device 100 may rotate the modified filter [1,1,1; 5,1,1; 1,1,1] by 45 degrees in a counterclockwise direction to obtain the modified filter [1,1,1; 1,1,1; 5,1,1]. The electronic device 100 may rotate the modified filter [1,1,1; 1,1,1; 5,1,1] by 45 degrees in a counterclockwise direction to obtain the modified filter [1,1,1; 1,1,1; 1,5,1].

Unlike FIG. 9, the electronic device 100 may obtain a new modified filter through iteration based on the obtained modified filter.

The methods calculated in FIG. 9 and FIG. 10 may obtain the same output value. However, when actually applied to an algorithm that performs convolution operation, there may be differences in the computation rate by a variety of reasons. The speed of conversion operation may vary depending on the type of algorithm applied to the CNN model, the size of the input image, and the number of conversance filters set by the user. Accordingly, the electronic device 100 may determine the method of obtaining the modified filter (FIG. 9) with reference to the basic filter based on the type of algorithm applied to the CNN model, the size of the input image, the number of convolution filters set by the user, and the capacity of the memory and the method for obtaining a new modified filter using the modified filter (FIG. 10). For example, if the number of convolution filters for analyzing an input image is greater than or equal to a predetermined number, a new modified filter may be obtained using the obtained modified filter.

Figure 11:
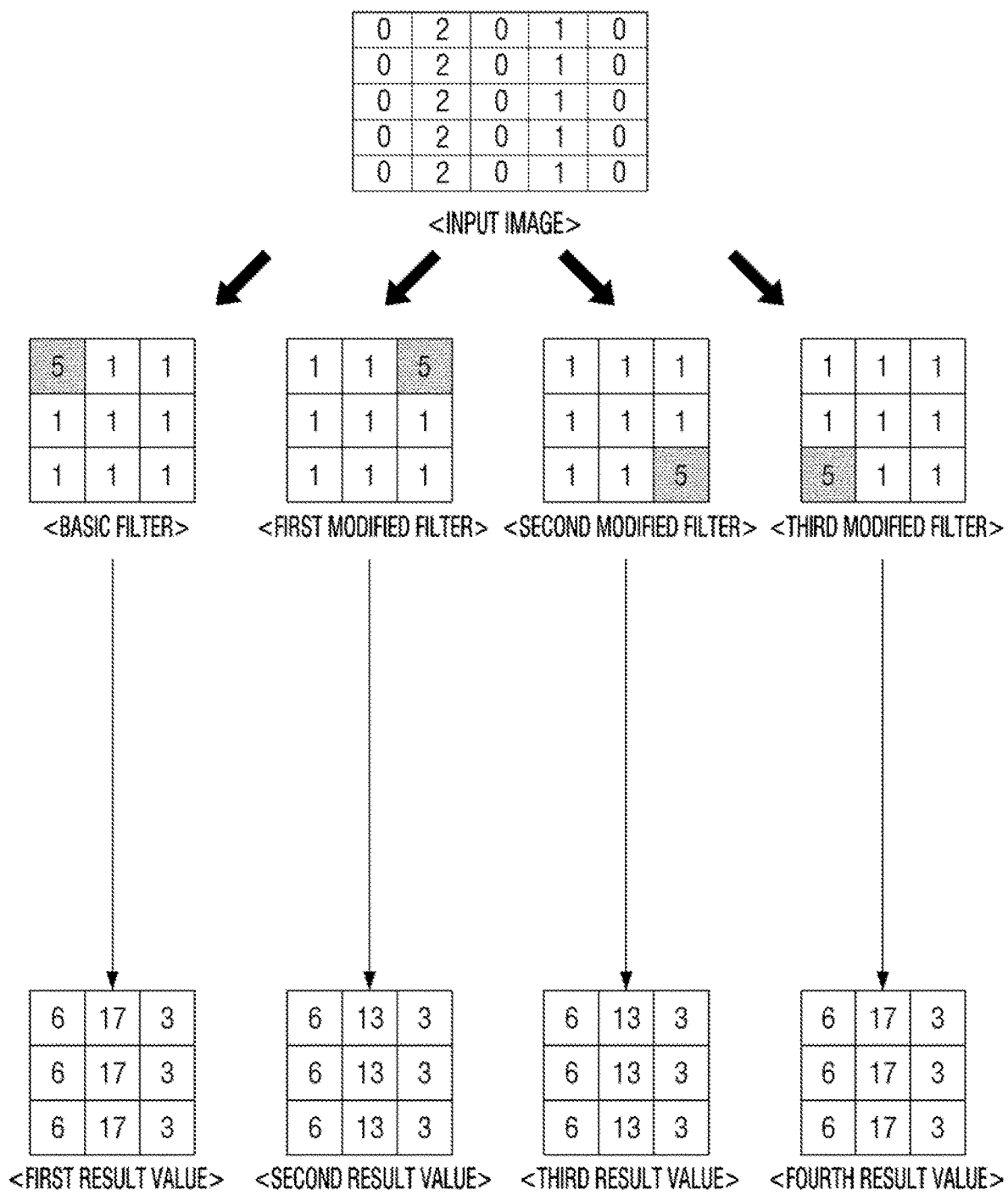
FIG. 11 is a diagram illustrating a convolution operation process according to an embodiment.

FIG. 11 is a diagram illustrating a convolution operation process according to an embodiment.

With reference to FIG. 11, the electronic device 100 may use four conversion filters to analyze the input image. For example, there may be the basic filter [5,1,1; 1,1,1; 1,1,1]. The electronic device 100 may rotate the basic filter in a clockwise direction to obtain the first modified filter [1,1,5; 1,1,1; 1,1,1], the second modified filter [1,1,1; 1,1,1; 1,1,5], and a third modified filter [1,1,1; 1,1,1; 5,1,1]. The first modified filter may be a filter that rotates the basic filter 90 degrees in a clockwise direction. The second modified filter may be a filter that rotates the basic filter 180 degrees in a clockwise direction. The third modified filter may be a filter that rotates the basic filter 270 degrees in a clockwise direction.

The second modified filter may be a filter that rotates the first modified filter 90 degrees in a clockwise direction. The third modified filter may be a filter that rotates the second modified filter 90 degrees in a clockwise direction.

The electronic device 100 may obtain the first result values [6,17,3; 6,17,3; 6,17,3] using the convolution operation to which the basic filter is applied. The electronic device 100 may obtain the second result value [6,13,3; 6,13,3; 6,13,3] by the convolution operation applied with the first modified filter. In the same manner, the electronic device 100 may obtain the third result value [6,13,3; 6,13,3; 6,13,3] and the fourth result value [6,17,3; 6,17,3; 6,17,3].

The electronic device 100 may obtain a representative value using a first result value, a second result value, a third result value, and a fourth result value. Here, the electronic device 100 may use an average value or a maximum value to obtain a representative value.

Figure 12:
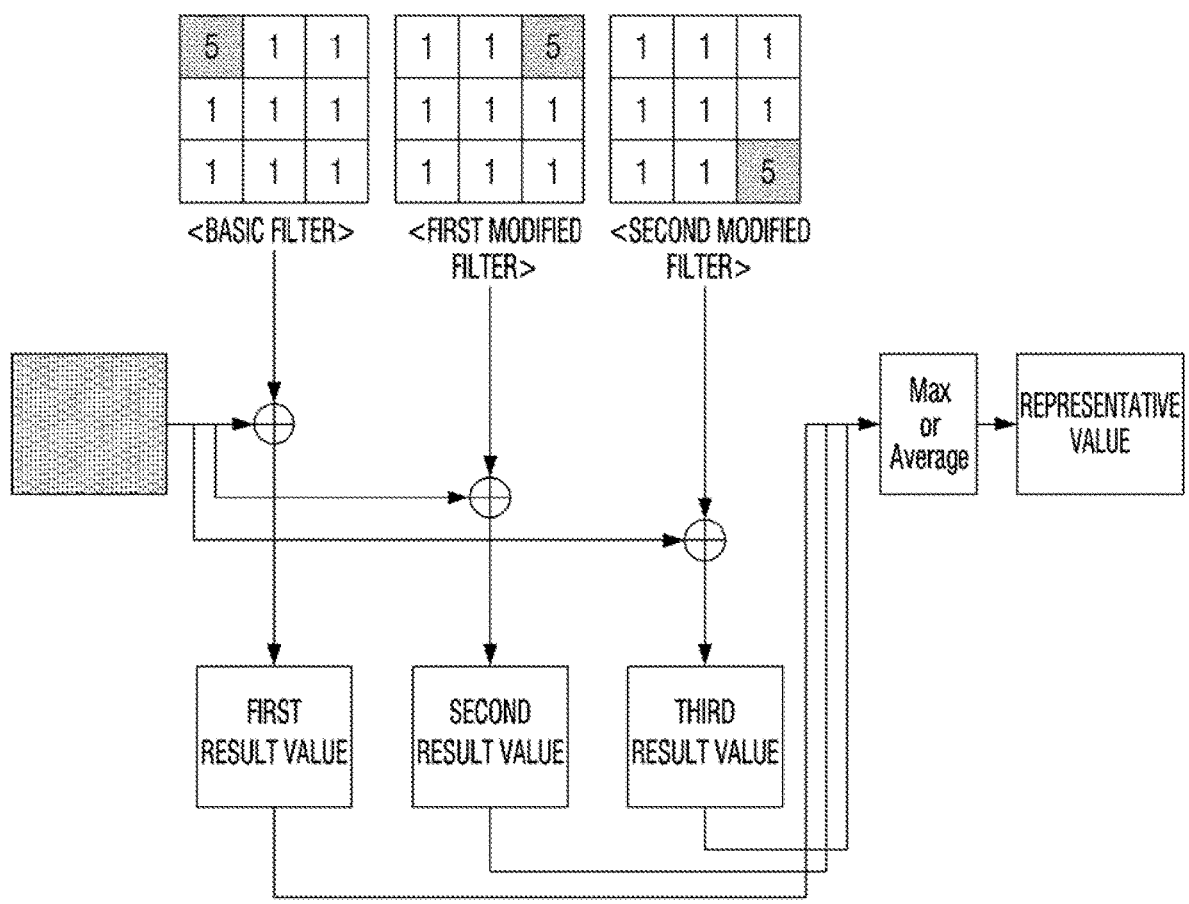
FIG. 12 is a diagram illustrating a convolution operation process according to still another embodiment.

FIG. 12 is a diagram illustrating a convolution operation process according to still another embodiment.

With reference to FIG. 12, the electronic device 100 may obtain pixel information from the input image. The electronic device 100 may apply the basic filter [5,1,1; 1,1,1; 1,1,1], the first modified filter [1,1,5; 1,1,1; 1,1,1], and the second modified filter [1,1,1; 1,1,1; 1,1,5] to the obtained pixel information and may obtain the first result value, the second result value, and the third result value. Here, the first modified filter may be a filter that rotates the basic filter 90 degrees in a clockwise direction. The second modified filter may be a filter that rotates the first modified filter 90 degrees in a clockwise direction again.

The electronic device 100 may obtain a representative value using the obtained first result value, the second result value, and the third result value. The electronic device 100 may use a maximum value or an average value to obtain a representative value.

FIG. 13 is a diagram illustrating an operation to obtain a modified filter by scaling a basic filter.

The electronic device 100 may obtain a modified filter by attempting scaling with regard to the element of the basic filter. The electronic device 100 may change the value of all of the elements of the basic filter in batches. For example, it is assumed that there is basic filter [2,1,2; 1,3,1; 2,1,2]. The electronic device 100 may scale the basic filter [2,1,2; 1,3,1; 2,1,2] and obtain the modified filter [4,2,4; 2,6,2; 4,2,4].

The electronic device 100 may obtain a modified filter by selectively scaling the elements of the basic filter. Referring to FIG. 13, there is a basic filter of 3* 3 size. The element groups may be divided by locations. For example, the basic filter may be [2,1,2; 1,3,1; 2,1,2], and may be represented as [second element, third element, second element; third element, first element, third element; second element, third element, second element].

The electronic device 100 may obtain a modified filter through a scaling method that extends based on a central element of the basic filter. The electronic device 100 may move the value of the central element to the outside. For example, based on the first element, the electronic device 100 may move a value of the central element in a diagonal direction of the outer direction. Referring to FIG. 13, a first element value 3 may be input to a location which is classified as a second element. Here, the modified filter may be [3,1,3; 1,3,1; 3,1,3].

The electronic device 100 may further extend the central element (first element) to a portion (third element portion) that is not a diagonal direction of the outer direction. Referring to FIG. 13, 3 which is a first element value may be input to a third element located up, down, left, and right of the first element. Here, the modified filter may be [3,3,3; 3,3,3; 3,3,3]. A modified filter that extends only in a diagonal direction may be obtained according to the setting of the electronic device 100, and only a modified filter that extends in the up, down, left, and right directions may be obtained. In addition, it is possible to obtain a modified filter that extends in both the diagonal direction and up, down, left, and right directions.

In describing FIG. 13, the first element, the second element, and the third element correspond to a plurality of locations, but the element of the electronic device 100 in actual implementation may refer to one value corresponding to one pixel.

Figure 14:
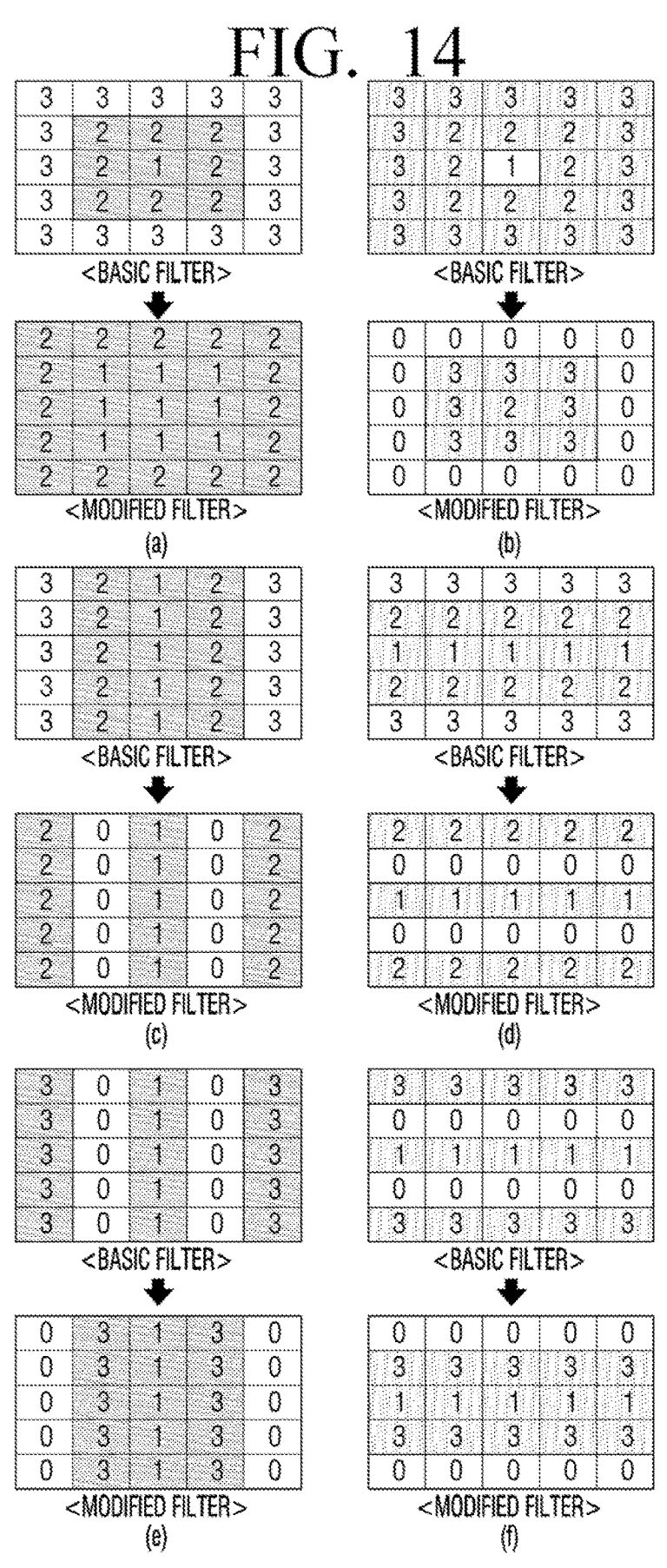

FIG. 14 is a diagram illustrating various embodiments of obtaining a modified filter by scaling.

Referring to FIG. 14, the electronic device 100 may perform scaling on the basis of a specific portion of the basic filter to obtain a modified filter. Here, the scaling may be divided into an expansion, a reduction, and a horizontal and a vertical basis.

Referring to FIG. 14A, scaling may be performed on the basis of a central region [2,2,2; 2,1,2; 2,2,2] in a size of 3*3 among basic filters having a size of 5*5. The electronic device 100 may obtain a modified filter by expanding the center region [2,2,2; 2,1,2; 2,2,2] of the 3*3 size among the basic filters in the outer direction. Here, the scaling may correspond to a method of expanding both diagonal and up, down, left, and right directions of the outer direction.

Referring to FIG. 14B, the electronic device 100 may perform reduced scaling on the basis of the remaining area except for the central element portion of the basic filter. For example, the element value 2 of the inner region may be replaced by 3, which is an element value of the outer region. In addition, a zero value may be substituted at the location where 3, which is the element value of the outer region, is present. Here, the scaling may correspond to a method of reducing in the direction of the central element.

Referring to FIG. 14C, the electronic device 100 may perform expansion scaling in the left and right directions based on a specific column of the basic filter. For example, a modified filter may be obtained by a method of expanding left and right directions based on 2,3,4 columns among the basic filters having a size of 5*5. For example, the electronic device 100 may replace a value in column 1 with a value in column 2 and may replace a value in column 5 with a value in column 4. The column 2 and column 4 may be replaced with zero values. Meanwhile, the electronic device 100 according to another embodiment may obtain a modified filter while maintaining an existing value with respect to column 2 and column 4 of the basic filter.

Referring to FIG. 14D, the electronic device 100 may perform expansion scaling in up and down directions based on a specific row of the basic filter. For example, a modified filter may be obtained by a method of expanding the basic filter of 5*5 size with respect to 2, 3, 4 rows in an up and low directions. For example, the electronic device 100 may replace a value in row 1 with a value in row 2 and replace a value in row 5 with a value in row 4. Here, row 2 and row 4 may be replaced with zero values. The electronic device 100 according to another embodiment may obtain a modified filter while maintaining an existing value for row 2 and row 4 of the basic filter.

Referring to FIG. 14E, the electronic device 100 may perform reduction scaling in the left and right directions based on a specific column of the basic filter. For example, a modified filter may be obtained by a method of reducing the basic filter of 5 *5 size in the left and right directions with respect to rows 1, 3, and 5. For example, the electronic device 100 may replace a value in column 2 with a value in column 1 and replace a value in column 4 with a value in column 5. Here, columns 1 and 5 may be replaced with 0. Meanwhile, the electronic device 100 according to another embodiment may obtain a modified filter while maintaining an existing value with respect to columns 1 and 5 of the basic filter.

Referring to FIG. 14F, the electronic device 100 may perform reduction scaling in the left and right directions based on a particular row of the basic filter. For example, a modified filter may be obtained by a method of reducing the basic filters of 5*5 size in the vertical direction with respect to columns 1, 3, and 5. For example, the electronic device 100 may replace the value in row 2 with a value in row 1 and may replace the value in row 4 with a value in row 5. Here, rows 1 and 5 may be replaced with value 0. The electronic device 100 according to another embodiment may obtain a modified filter while maintaining an existing value for row 1 and row 5 of the basic filter.

Figure 15:
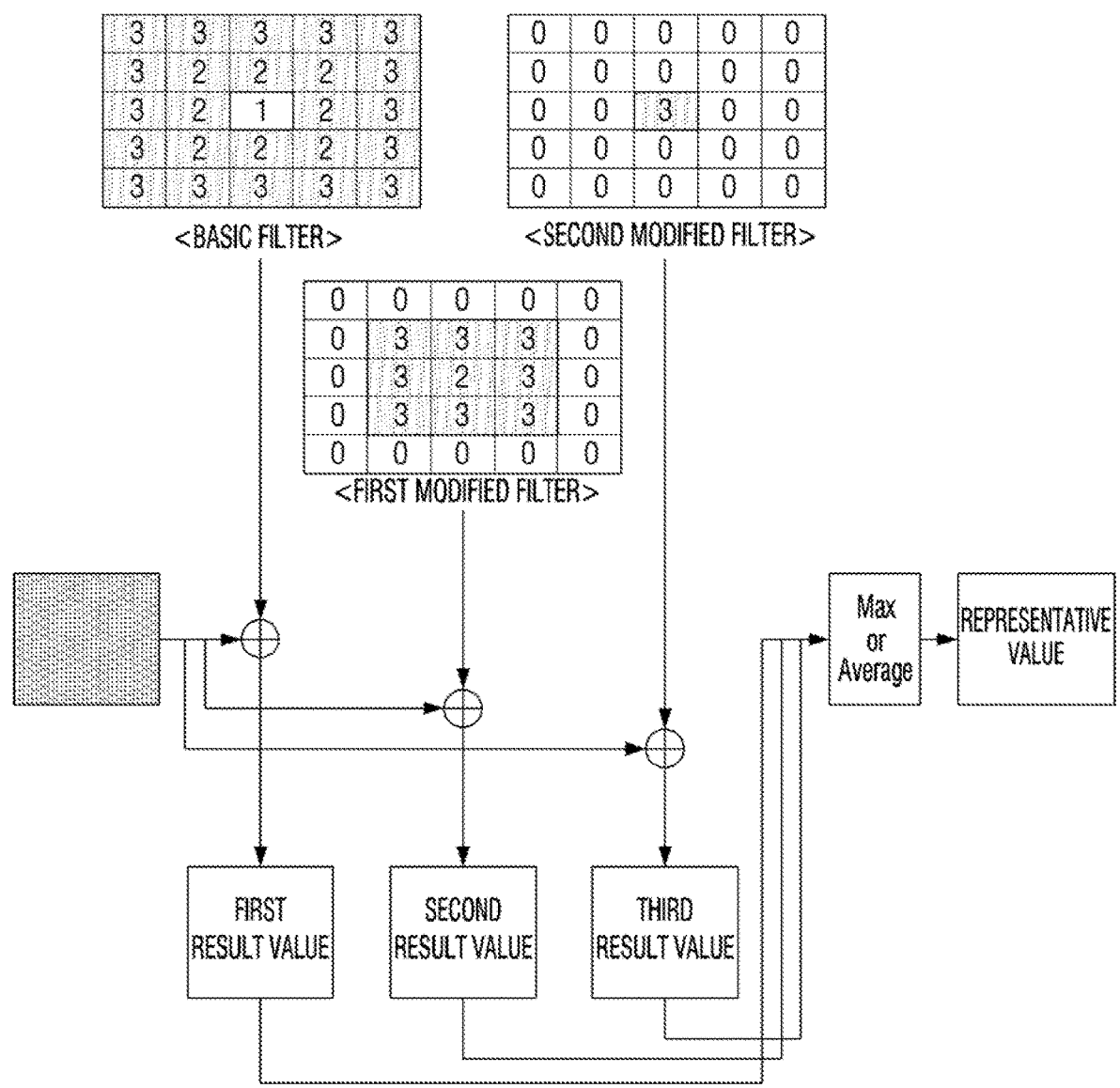
FIG. 15 is a diagram illustrating a convolution operation process according to still another embodiment.

FIG. 15 is a diagram illustrating a convolution operation process according to still another embodiment.

Referring to FIG. 15, the electronic device 100 may obtain pixel information from an input image. The electronic device 100 may apply a basic filter, a first modified filter, and a second modified filter using the obtained pixel information. The electronic device 100 may use a scaling method to obtain a modified filter. Specifically, the basic filter may perform reduction scaling on the basis of a specific region of the basic filter. The electronic device 100 may obtain a first modified filter by performing reduction scaling in an internal direction with respect to a central element for the basic filter. Further, the second modified filter may be obtained by scaling down the first modified filter in the inner direction with respect to the central element.

The electronic device 100 may obtain a first result value, a second result value, and a third result value using three convolution filters. In addition, one representative value may be obtained by using the three result values. The electronic device 100 may use a maximum value or an average value to obtain a representative value.

FIG. 16 is a diagram illustrating an embodiment of applying an input image including three channels to the CNN model.

Referring to FIG. 16, the electronic device 100 may analyze an input image including a plurality of channels. For example, the input image may include R, G, B channels. The electronic device 100 may obtain pixel information for each channel. The electronic device 100 may store a basic filter for each channel. The electronic device 100 may store the basic filter [5,1,1; 1,1,1; 1,1,1] corresponding to the R channel, the basic filter [3,3,1; 1,1,1; 1,1,1] corresponding to the G channel, and the basic filter [1,1,1; 2,1,1; 2,1,1] corresponding to the B channel.

The electronic device 100 may obtain modified filters for each basic filter. For example, the electronic device 100 may obtain modified filters by rotating in a clockwise direction by 90 degrees. The electronic device 100 may obtain a modified filter [1,1,5; 1,1,1; 1,1,1] by rotating the basic filters [5,1,1; 1,1,1; 1,1,1] corresponding to the R channel. The electronic device 100 may obtain the modified filters [1,1,3; 1,1,3; 1,1,1] by rotating the basic filter [3,3,1; 1,1,1; 1,1,1] corresponding to the G channel. The electronic device 100 may obtain the modified filter [2,2,1; 1,1,1; 1,1,1] by rotating the basic filters [1,1,1; 2,1,1; 2,1,1] corresponding to the B channel.

The electronic device 100 may obtain a plurality of result values by applying each convolution filter. Referring to FIG. 16, the electronic device 100 may obtain a total of six result values for R, G, and B channels.

The electronic device 100 may obtain a representative value for each channel. For example, the electronic device 100 may obtain a first representative value for the R channel, a second representative value for the G channel, and a third representative value for the B channel. The electronic device 100 may sum a plurality of representative values for each channel and convert the values to one value.

The electronic device 100 according to another embodiment may individually apply weights according to each channel without summing a plurality of representative values for each channel. The electronic device 100 may sum the output values for each channel to which the weight is applied as one output value.

FIG. 17 is a diagram illustrating an embodiment of generating a modified filter differently by analyzing an input image.

Referring to FIG. 17, the electronic device 100 may determine a method for obtaining the modified filter by analyzing an input image. The electronic device 100 may obtain a feature portion of the input image. The electronic device 100 may obtain pixel information for the feature portion of the input image. A pattern of the pixel information of the input image may be identified according to the nature of the texture. It is assumed that the texture of the vertical stripe type is identified in FIG. 17. It is assumed that the input image a corresponds to a target having a relatively wide interval of vertical line pattern, and the input image b corresponds to a target having a relatively narrow interval of a vertical line pattern.

The electronic device 100 may obtain a pixel information distribution of the target based on pixel information obtained from an input image. The electronic device 100 may obtain a repeated pattern of the target based on the obtained pixel information distribution of the target. The electronic device 100 may identify an interval of repeated patterns. The electronic device 100 may determine a method of obtaining a modified filter based on an interval of repeated patterns.

For example, if the electronic device 100 identifies that the interval of the pattern repeated for the input image a is greater than or equal to a predetermined threshold value, the electronic device 100 may rotate the basic filter by a large rotation angle (180 degrees) in a clockwise direction (or a counterclockwise direction) to obtain a modified filter. Further, if the electronic device 100 rotates 180 degrees to obtain a modified filter, the electronic device 100 may set to obtain only one modified filter. Since the rotation is based on 360 degrees, up to two convolution filters may be required, and the electronic device 100 may perform a convolution operation with a basic filter and a modified filter. If the angle of rotation is 120 degrees, the electronic device 100 may require a total of three convolutional filters and may obtain two modified filters.

If the electronic device 100 identifies that the interval of the pattern repeated for the input image b is less than or equal to a predetermined threshold value, the electronic device 100 may rotate the basic filter by a smaller degree (90 degrees) in a clockwise direction (or a counterclockwise direction) to obtain a modified filter. Since rotation is based on 360 degrees, only four convolution filters may be required, and the electronic device 100 may perform a convolution operation with a basic filter and three modified filters. If the angle of rotation is 45 degrees, the electronic device 100 may require a total of eight convolutional filters and obtain seven modified filters.

Figure 18:
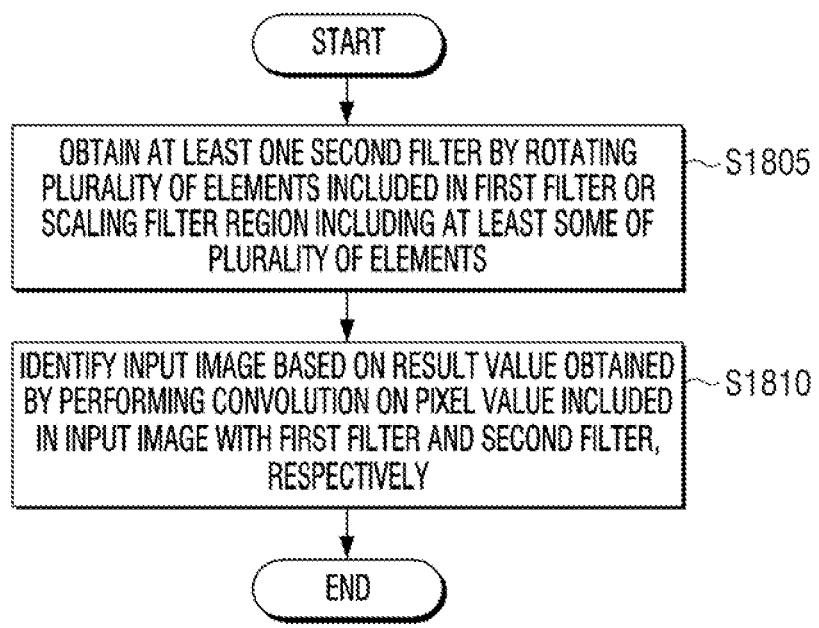
FIG. 18 is a flowchart of an electronic device according to an embodiment.

FIG. 18 is a flowchart of an electronic device according to an embodiment.

A control method of the electronic device 100 storing a first filter for identifying an input image according to an embodiment may include obtaining at least one second filter by rotating a plurality of elements included in the first filter or scaling a filter region including at least some of the plurality of elements in operation S1805. The method may include identifying the input image based on a result value obtained by performing convolution on a pixel value included in an input image with the first filter and the second filter, respectively in operation S1810.

The identifying the input image in operation S1810 may include obtaining a first result value by performing convolution on a pixel value included in the input image with the first filter, obtaining a second result value by performing convolution on a pixel value included in the input image with the second filter, and identifying an input image for identifying a texture type of the input image based on a representative value obtained based on the first result value and the second result value.

The identifying the input image in operation S1810 may include obtaining a probability of including a predetermined texture type in the input image by applying a weight corresponding the predetermined texture type to the representative value.

The obtaining the second filter in operation S1805 may include obtaining the second filter by sequentially rotating the plurality of elements included in the first filter by a predetermined angle in a clockwise direction or a counterclockwise direction.

The obtaining the second filter in operation S1805 may include obtaining a first modified filter by sequentially rotating the plurality of elements included in the first filter by a first angle in a clockwise direction or a counterclockwise direction, and obtaining a second modified filter by sequentially rotating the plurality of elements included in the first filter by a second angle in a clockwise direction or a counterclockwise direction.

The obtaining the second filter in operation S1805 may include obtaining a first modified filter by sequentially rotating the plurality of elements included in the first filter by a first angle in a clockwise direction or a counterclockwise direction, and obtaining a second modified filter by sequentially rotating the plurality of elements included in the first filter by a first angle in a clockwise direction or a counterclockwise direction.

The obtaining the second filter in operation S1805 may include obtaining the second filter by moving a position of at least some elements included in the filter region in a scaling direction.

The obtaining the second filter in operation S1805 may include obtaining the second filter by enlarging the filter region by moving a location of a first element included in the filter region to outside of the filter region, replacing a second element included in a location to which the first element is moved with the first element, and replacing a third element included in a location to which the first element is not moved at an outside of the filter region with the first element.

The control method of the electronic device 100 storing a first basic filter and a second basic filter that correspond to a first input channel and a second input channel and correspond to a first filter to identify the input image, the obtaining second filter may include obtaining a first modified filter and a second modified filter by rotating a plurality of elements included in the first basic filter and the second basic filter or scaling a filter region including at least some of the plurality of elements, obtaining a first result value by performing convolution on a pixel value corresponding to a first input channel included in the input image with the first basic filter, obtaining a second result value by performing convolution on a pixel value corresponding to the first input channel with the first modified filter, obtaining a third result value by performing convolution on a pixel value corresponding to the second input channel included in the input image with the second basic filter, obtaining a fourth result value by performing convolution on a pixel value corresponding to the second input channel with the second modified filter, and identifying a texture type of the input image based on a first representative value obtained based on the first result value and the second result value, and a second representative value obtained based on the third result value and the fourth result value.

The identifying the input image may include obtaining a first probability value by applying a first weight corresponding to a first texture type to the first representative value, obtaining a second probability value by applying a second weight corresponding to the first texture type to the second representative value, obtaining a third probability value by applying a third weight corresponding to a second texture type to the first representative value, obtaining a fourth probability value by applying a fourth weight corresponding to the second texture type to the second representative value, obtaining a probability of including the first texture type in the input image by summing the first probability value and the second probability value, and obtaining a probability of including the second texture type in the input image by summing the third probability value and the fourth probability value.

The method of controlling the electronic device 100 as illustrated in FIG. 18 may be executed in the electronic device having a configuration of FIG. 3 and may be executed in an electronic device including other configurations.

Methods according to the embodiments as described above may be implemented as an application format installable in an existing electronic device.

Methods according to the embodiments as described above may be implemented as software upgrade or hardware upgrade for an existing electronic device.

Embodiments described above may be performed through an embedded server provided in an electronic device, or an external server of an electronic device.

The control method of an electronic device may be implemented with a program and provided to the electronic device. A program including the control method of an electronic device may be stored in a non-transitory computer readable medium and provided.

In a non-transitory computer readable medium storing computer instructions causing the electronic device to perform operations, when executed by the processor 120 of the electronic device storing a basic filter for identifying an input image according to an embodiment, the operation may include obtaining at least one second filter by rotating a plurality of elements included in a first filter, or scaling a filter region including at least some of the plurality of elements. Based on a result value of convolution on the pixel value included in the input image with the first filter and the second filter, respectively, the input image may be identified.

The various embodiments described above may be implemented in a recordable medium which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic device according to the various embodiments described above may be stored in a non-transitory computer-readable medium. The computer instructions stored in this non-transitory computer-readable medium cause the above-described specific device to perform the processing operations in the electronic device according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device comprising:
   a memory configured to store a first filter for identifying an input image; and
   a processor configured to:
   obtain at least one second filter by rotating a plurality of elements included in the first filter or scaling a filter region including at least some of the plurality of elements, and identify the input image based on a result value obtained by performing convolution on a pixel value included in the input image with the first filter and the second filter, respectively, wherein the processor is further configured to:

obtain a first result value by performing convolution on a pixel value included in the input image and the first filter, obtain a second result value by performing convolution on a pixel value included in the input image and the second filter, and identify an input image for identifying a texture type of the input image based on a representative value obtained based on the first result value and the second result value.

2. The electronic device of claim 1, wherein the processor is further configured to obtain a probability of including a predetermined texture type in the input image by applying a weight corresponding the predetermined texture type to the representative value.

3. The electronic device of claim 1, wherein the processor is further configured to obtain the second filter by sequentially rotating the plurality of elements included in the first filter by a predetermined angle in a clockwise direction or a counterclockwise direction.

4. The electronic device of claim 3, wherein the processor is further configured to:

obtain a first modified filter by sequentially rotating the plurality of elements included in the first filter by a first angle in a clockwise direction or a counterclockwise direction, and obtain a second modified filter by sequentially rotating the plurality of elements included in the first filter by a second angle in a clockwise direction or a counterclockwise direction.

5. The electronic device of claim 3, wherein the processor is further configured to:

obtain a first modified filter by sequentially rotating the plurality of elements included in the first filter by a first angle in a clockwise direction or a counterclockwise direction, and obtain a second modified filter by sequentially rotating the plurality of elements included in the first modified filter by the first angle in a clockwise direction or a counterclockwise direction.

6. The electronic device of claim 1, wherein the processor is further configured to obtain the second filter by moving a position of at least some elements included in the filter region in a scaling direction.

7. The electronic device of claim 6, wherein the processor is further configured to: obtain the second filter by enlarging the filter region by moving a location of a first element included in the filter region to outside of the filter region, replacing a second element included in a location to which the first element is moved with the first element, and replacing a third element included in a location to which the first element is not moved at an outside of the filter region with the first element.

8. The electronic device of claim 1, wherein the memory is further configured to store a first basic filter and a second basic filter that correspond to a first input channel and a second input channel and correspond to a first filter to identify the input image, wherein the processor is further configured to:

obtain a first modified filter and a second modified filter by rotating a plurality of elements included in the first basic filter and the second basic filter or scaling a filter region including at least some of the plurality of elements, obtain a first result value by performing convolution on a pixel value corresponding to a first input channel included in the input image with the first basic filter, obtain a second result value by performing convolution on a pixel value corresponding to the first input channel with the first modified filter, obtain a third result value by performing convolution on a pixel value corresponding to the second input channel included in the input image with the second basic filter, obtain a fourth result value by performing convolution on a pixel value corresponding to the second input channel with the second modified filter, and identify a texture type of the input image based on a first representative value obtained based on the first result value and the second result value, and a second representative value obtained based on the third result value and the fourth result value.

9. The electronic device of claim 8, wherein the processor is further configured to:

obtain a first probability value by applying a first weight corresponding to a first texture type to the first representative value, obtain a second probability value by applying a second weight corresponding to the first texture type to the second representative value, obtain a third probability value by applying a third weight corresponding to a second texture type to the first representative value, obtain a fourth probability value by applying a fourth weight corresponding to the second texture type to the second representative value, obtain a probability of including the first texture type in the input image by summing the first probability value and the second probability value, and obtain a probability of including the second texture type in the input image by summing the third probability value and the fourth probability value.

10. A control method of an electronic device storing a first filter for identifying an input image, the method comprising:

obtaining at least one second filter by rotating a plurality of elements included in the first filter or scaling a filter region including at least some of the plurality of elements; and identifying the input image based on a result value obtained by performing convolution on a pixel value included in an input image with the first filter and the second filter, respectively, wherein the identifying the input image comprises:

obtaining a first result value by performing convolution on a pixel value included in the input image with the first filter;

obtaining a second result value by performing convolution on a pixel value included in the input image with the second filter; and identifying an input image for identifying a texture type of the input image based on a representative value obtained based on the first result value and the second result value.

11. The electronic device of claim 10, wherein the identifying the input image comprises obtaining a probability of including a predetermined texture type in the input image by applying a weight corresponding the predetermined texture type to the representative value.

12. The method of claim 10, wherein the obtaining the second filter comprises obtaining the second filter by sequentially rotating the plurality of elements included in the first filter by a predetermined angle in a clockwise direction or a counterclockwise direction.

13. The method of claim 12, wherein the obtaining the second filter comprises:
- obtaining a first modified filter by sequentially rotating the plurality of elements included in the first filter by a first angle in a clockwise direction or a counterclockwise direction, and
- obtaining a second modified filter by sequentially rotating the plurality of elements included in the first filter by a second angle in a clockwise direction or a counterclockwise direction.

* * * * *